(12) United States Patent
Zhang et al.

(10) Patent No.: US 11,746,643 B2
(45) Date of Patent: Sep. 5, 2023

(54) METHODS AND APPARATUS FOR CEMENT BOND EVALUATION THROUGH PRODUCTION TUBING

(71) Applicant: Probe Technology Services, Inc., Fort Worth, TX (US)

(72) Inventors: Jun Zhang, Katy, TX (US); Yibing Zheng, West University, TX (US)

(73) Assignee: Probe Technology Services, Inc., Fort Worth, TX (US)

( * ) Notice: Subject to any disclaimer, the term of this patent is extended or adjusted under 35 U.S.C. 154(b) by 174 days.

(21) Appl. No.: 17/382,620

(22) Filed: Jul. 22, 2021

(65) Prior Publication Data

US 2021/0348500 A1 Nov. 11, 2021

Related U.S. Application Data

(62) Division of application No. 16/006,064, filed on Jun. 12, 2018, now Pat. No. 11,091,999.

(51) Int. Cl.
*E21B 47/005* (2012.01)
*G01V 1/50* (2006.01)
*G01V 1/40* (2006.01)
*E21B 33/14* (2006.01)

(52) U.S. Cl.
CPC .............. *E21B 47/005* (2020.05); *G01V 1/40* (2013.01); *G01V 1/50* (2013.01); *E21B 33/14* (2013.01)

(58) Field of Classification Search
CPC ......... E21B 47/005; E21B 33/14; G01V 1/40; G01V 1/50
See application file for complete search history.

(56) References Cited

U.S. PATENT DOCUMENTS

| | | | | |
|---|---|---|---|---|
| 5,216,638 | A * | 6/1993 | Wright | E21B 47/005 702/6 |
| 6,850,462 | B2 * | 2/2005 | McDaniel | G01V 1/44 181/105 |
| 7,372,777 | B2 * | 5/2008 | Hurst | B06B 1/0633 367/159 |
| 7,411,864 | B2 * | 8/2008 | Hurst | G01V 1/46 340/853.3 |
| 7,911,876 | B2 * | 3/2011 | Hurst | G01V 1/46 181/102 |

(Continued)

*Primary Examiner* — Ian J Lobo
(74) *Attorney, Agent, or Firm* — D. Tiller Law PLLC; Don Tiller

(57) ABSTRACT

Various downhole logging tools and methods of using and making the same are disclosed. In one aspect a method evaluating cement bond quality in a well is provided. In a well with a particular casing/tubing configuration, waveforms of acoustic energy returning from the tubing and the casing with the tubing present are recorded. A frequency spectrum from the recorded waveforms is determined. Amplitudes of the returning acoustic energy at one or more preselected frequency(s) of interest of a range of frequencies at which the amplitudes are noticeably affected by cement bond quality for the particular casing/tubing configuration are determined. The determined amplitudes are compared with one or more baseline amplitudes to look for indications of cement bond quality. Other aspects involve time domain analysis.

10 Claims, 22 Drawing Sheets

(56) References Cited

U.S. PATENT DOCUMENTS

| | | | | |
|---|---|---|---|---|
| 8,270,248 B2* | 9/2012 | Hurst | ............... | G01V 1/46 |
| | | | | 367/13 |
| 2006/0262644 A1* | 11/2006 | Schoepf | ............... | G01N 29/11 |
| | | | | 367/35 |
| 2013/0147316 A1* | 6/2013 | Matam | ............... | E21B 47/005 |
| | | | | 310/327 |
| 2015/0177405 A1* | 6/2015 | Jannin | ............... | G01V 1/46 |
| | | | | 702/6 |
| 2015/0198732 A1* | 7/2015 | Zeroug | ............... | E21B 47/005 |
| | | | | 367/35 |
| 2016/0069842 A1* | 3/2016 | Bonavides | ............... | G01V 3/30 |
| | | | | 73/152.03 |
| 2016/0109604 A1* | 4/2016 | Zeroug | ............... | G01V 1/50 |
| | | | | 367/13 |
| 2016/0109605 A1* | 4/2016 | Bose | ............... | E21B 47/005 |
| | | | | 367/35 |

* cited by examiner

METHODS AND APPARATUS FOR CEMENT BOND EVALUATION THROUGH PRODUCTION TUBING

CROSS-REFERENCE TO RELATED APPLICATIONS

This application is a division of U.S. application Ser. No. 16/006,064, filed on Jun. 12, 2018.

BACKGROUND

A well casing is a metal pipe inserted into a borehole to provide mechanical support for the borehole and to enable the driller to control the types of subsurface fluids allowed to enter the borehole and the locations for such entries. Well casings are normally constructed of ferromagnetic steels. An annulus fill material (e.g., cement) is disposed in the annular space between the casing and the earth formation. One objective of filling the annular space is to separate oil and gas-producing layers from each other, and from water-bearing formation strata. If the cement fails to provide isolation of one zone from another, fluids under pressure may migrate from one zone to another, reducing production efficiency, and potentially raising safety issues. Evaluating the annulus content is important for reliable determination of the zonal isolation of the different strata of a formation.

At the end of a life cycle of an oil and gas well, well integrity evaluation becomes an essential part of the plug and abandonment (P&A) process. The cement quality is one key factor which requires verification to confirm there are no leak paths behind the existing casing to the surface before any P&A process is done. Conventional cement bond logging (CBL) involves inserting an acoustic logging tool into the casing without the production tubing in place such that there is only the borehole fluid present. Acoustic waves are emitted from the tool's transmitter into the fluid and then directly to the casing. A portion of the waves will stay inside the well traveling along the fluid. Some part of the waves will travel inside the casing. Other parts are refracted into the cement and the formation. If the casing is firmly cemented, the acoustic coupling between the casing and the formation is robust such that acoustic energy easily travels into the formation. In this case, the portion of the acoustic energy traveling down the casing is small. However, if the casing is not properly cemented to the formation, there is a layer of fluid annulus between them. Instead of leaking into the formation, the acoustic energy will be confined in the casing. Therefore, there is strong acoustic energy traveling down the casing and into the receivers in the tool. Since the velocity of this acoustic wave in the casing is the fastest, the amplitude of the first peak in the waveform indicates the amount of acoustic energy traveling down the casing, which is usually used for cement bond evaluation. A large amplitude means the low quality of the cement bond behind the casing, while a low amplitude indicates a good cement bond.

SUMMARY

In accordance with one aspect of the present invention, a method evaluating cement bond quality in a well is provided. In a well with a particular casing/tubing configuration, waveforms of acoustic energy returning from the tubing and the casing with the tubing present are recorded. A frequency spectrum from the recorded waveforms is determined. Amplitudes of the returning acoustic energy at one or more preselected frequency(s) of interest of a range of frequencies at which the amplitudes are noticeably affected by cement bond quality for the particular casing/tubing configuration are determined. The determined amplitudes are compared with one or more baseline amplitudes to look for indications of cement bond quality.

In accordance with another aspect of the present invention, a method is provided of evaluating cement bond quality in a well with a particular casing/tubing configuration using waveforms of acoustic energy returning from the tubing and the casing with the tubing present. A frequency spectrum from the recorded waveforms is determined. Amplitudes of the returning acoustic energy at one or more preselected frequency(s) of interest of a range of frequencies at which the amplitudes are noticeably affected by cement bond quality for the particular casing/tubing configuration are determined. The determined amplitudes are compared with one or more baseline amplitudes to look for indications of cement bond quality.

In accordance with another aspect of the present invention, a method evaluating cement bond quality in a well is provided. In a well with a particular casing/tubing configuration, waveforms of acoustic energy returning from the tubing and the casing with the tubing present are recorded. The lengths of wave cycles of the recorded waveforms for at least one preselected time window for the particular casing/tubing configuration are determined. A determination is made if the lengths of the wave cycles increase or decrease relative to a baseline wave cycle length and at what depths to look for indications of cement bond quality.

In accordance with another aspect of the present invention, a method evaluating cement bond quality in a well with a particular casing/tubing configuration using waveforms of acoustic energy returning from the tubing and the casing with the tubing present is provided. The lengths of wave cycles of the recorded waveforms for at least one preselected time window for the particular casing/tubing configuration are determined. A determination is made if the lengths of the wave cycles increase or decrease relative to a baseline wave cycle length and at what depths to look for indications of cement bond quality.

In accordance with another aspect of the present invention, an apparatus for evaluating cement bond quality is provided. The apparatus includes a storage device for storing recorded waveforms of acoustic energy, in a well with a particular casing/tubing configuration, returning from the tubing and the casing with the tubing present. The apparatus includes a processor programmed to determine a frequency spectrum from the recorded waveforms, to determine amplitudes of the returning acoustic energy at one or more preselected frequency(s) of interest of a range of frequencies at which the amplitudes are noticeably affected by cement bond quality for the particular casing/tubing configuration, and to generate a comparison of the determined amplitudes with one or more baseline amplitudes to provide indications of cement bond quality.

In accordance with another aspect of the present invention, an apparatus for evaluating cement bond quality is provided. The apparatus includes a storage device for storing recorded waveforms of acoustic energy, in a well with a particular casing/tubing configuration, returning from the tubing and the casing with the tubing present. The apparatus also includes a processor programmed to determine the lengths of wave cycles of the recorded waveforms for at least one preselected time window for the particular casing/tubing configuration, and to determine if the lengths of the wave cycles increase or decrease relative to a baseline wave cycle length and at what depths to provide indications of cement bond quality.

In accordance with another aspect of the present invention, a computer readable that has computer-executable instructions for performing a method is provided. The method includes, in a well with a particular casing/tubing configuration, recording waveforms of acoustic energy returning from the tubing and the casing with the tubing present, determining a frequency spectrum from the recorded waveforms, determining amplitudes of the returning acoustic energy at one or more preselected frequency(s) of interest of a range of frequencies at which the amplitudes are noticeably affected by cement bond quality for the particular casing/tubing configuration, and comparing the determined amplitudes with one or more baseline amplitudes to look for indications of cement bond quality.

In accordance with another aspect of the present invention, a computer readable medium that has computer-executable instructions for performing a method of evaluating cement bond quality in a well with a particular casing/tubing configuration using waveforms of acoustic energy returning from the tubing and the casing with the tubing present is provided. The method includes determining the lengths of wave cycles of the recorded waveforms for at least one preselected time window for the particular casing/tubing configuration, and determining if the lengths of the wave cycles increase or decrease relative to a baseline wave cycle length and at what depths to look for indications of cement bond quality.

BRIEF DESCRIPTION OF THE DRAWINGS

The foregoing and other advantages of the invention will become apparent upon reading the following detailed description and upon reference to the drawings in which.

DETAILED DESCRIPTION

Currently, there is a lack of technologies to log cement quality from within production or other tubing. When a conventional CBL tool is placed inside production tubing, the acoustic signal is overwhelmingly dominated by the wave traveling down the free-stand tubing. Due to the large acoustic impedance contrast between the steel tubing and the fluid, the acoustic wave emitted from the tool is mostly confined inside the tubing body and the fluid in the tubing. Thus only a very small amount of acoustic energy can be transmitted through the tubing to the casing. Conventional CBL techniques that measures the amplitude of first peak (sometimes called "E1") will not yield usable information about the cement bond since the first arrival is only through the path traveling down the tubing and contains no cement bond information. The weak refracted wave from the casing and cement boundary arrives slightly later since its has to travel extra radial distances. The tubing arrivals tend to swamp casing arrivals in conventional CBL. Accordingly, conventional CBL requires production tubing to be pulled out of the well. However, pulling the tubing out may be very difficult and even impossible in some situations. Another costly alternative is to mill through the casing and tubing to remove all existing steel and cement for at least tens of feet for each plug section. However, the disclosed techniques enable a CBL tool to sense cement bond conditions with tubing in place.

Figure 1:
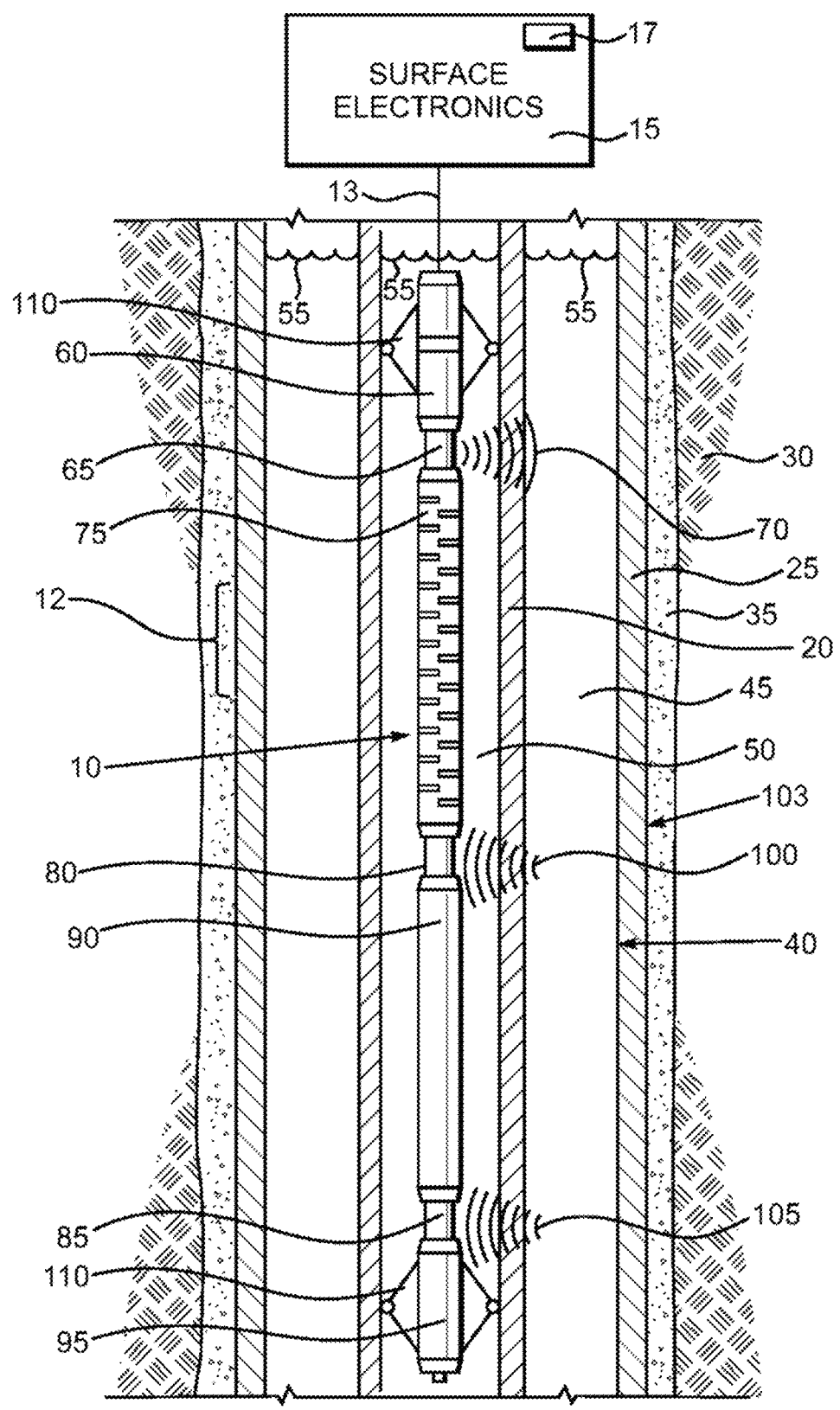
FIG. 1 is a schematic view of an exemplary embodiment of a downhole logging tool that may be used for cement bond logging and other uses.

In the drawings described below, reference numerals are generally repeated where identical elements appear in more than one figure. Turning now to the drawings, and in particular to FIG. 1, therein is shown a schematic view of an exemplary embodiment of a downhole logging tool 10 that can be used for cement bond logging in a well 12 and other uses. The downhole logging tool 10 is operatively coupled to a support cable 13, which may be a wireline or slickline. If configured as a wireline, the support cable 13 provides electrical connectivity and power between the downhole logging tool 10 and surface electronics 15, as well as mechanical suspension for the downhole logging tool 10. The support cable 13 is typically fed from a winch, passed around a pulley and engages an odometer or other type of distance measuring device (all not shown). The odometer (not shown) tracks the penetration depth of the downhole logging tool 10. In the event that the support cable 13 is a slick line, then an optional power and data storage module or sonde (not shown) may be attached to the downhole logging tool 10. The surface electronics 15 can include a processor 17 for data processing, power supply, data processing, telemetry, storage and virtually any other functions suitable for cable logging.

The downhole logging tool 10 is positioned inside a tubing 20, which can be a production tubing or other type of tubing. The tubing 20 is, in-turn, positioned inside a well casing 25 that is separated laterally from a surrounding formation 30 by way of a cemented annulus 35. The production tubing 20 can include one or more packers (not shown) that engage the inner wall 40 of the casing 25 and isolate one or more pay zones of the formation 30. The annulus 45 between the tubing 20 and the casing 25 and the annular 50 of the tubing 20 are typically filled with one or more liquids 55, such as fresh water, salt water, hydrocarbons, drilling or other fluids.

The downhole logging tool 10 includes several sections. In this illustrative arrangement, the downhole logging tool 10 includes a centralizer/connector section 60, which is designed to connect to the cable 13 a transmitter 65 that is operable to emit acoustic pulses 70, an acoustic isolator 75, one or more receivers and in this illustrative arrangement receivers 80 and 85 separated longitudinally by an electronics sub 90 and a lower connector section 95. The receivers 80 and 85 are operable to receive reflected acoustic pulses 100 and 105, respectively, returning from a variety of sources, such as the fluids 55 in the annular space 45 and the tubing interior 50 and the tubing 20 itself as well as preferably acoustic pulses returning from both the casing 25 and the cemented annulus 35. The downhole logging tool 10 can be centralized within the tubing 20 by way of plural centralizers, four of which are visible and labeled 110. There may be centralizers 110 at each end of the tool 10 and may number three or more and be of any configuration.

Figure 2:
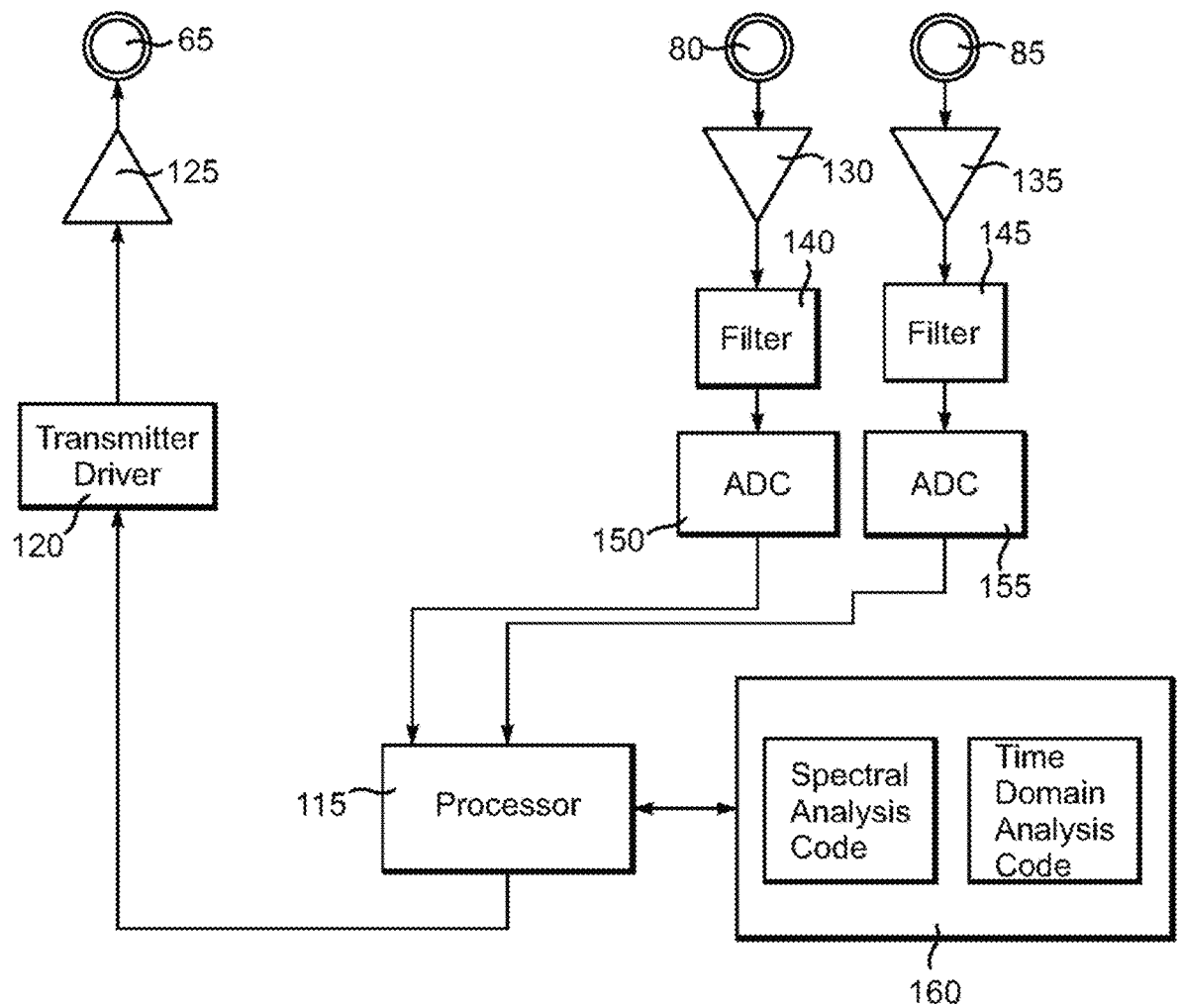
FIG. 2 is a block diagram depicting an exemplary embodiment of transmitter driving and receiver processing circuitry.

The electronics housing 90 can enclose a variety of different electronics suitable for operating the downhole logging tool 10. For example, and as shown in FIG. 2, which is a block diagram, the downhole logging tool 10 can include a processor 115 which can be a microprocessor, an accelerated processing unit which combines microprocessor and graphics processor capabilities, a system-on-chip, an application specific integrated circuit or other. The processor 115 is connected to a transmitter driver 120 which delivers an output to an amplifier 125 and ultimately electrical energy to the transmitter 65. As described in more detail below, one exemplary arrangement of the transmitter 65 is a stack of piezoelectric annular members that can be fired separately or in unison to deliver acoustic pulses at a variety of frequencies of interest. On the reception side, the two receivers 80 and 85 can also consist of annular piezoelectric elements that may consist of an unitary cylindrical shell composed of piezoelectric material mounted on one or more other cylindrical members to be described below. Optionally, and as described below, the receivers 80 and 85 can be composed of azimuthally-spaced piezoelectric segments to provide an azimuthally sensitive receiver. It should be understood that other types of transmitters/receivers, transducers etc. could be used to obtain data. Outputs of the receivers 80 and 85 are delivered to respective amplifiers 130 and 135 and from there to respective filters 140 and 145. The outputs of the filters 140 and 145 are delivered to analog to digital converters 150 and 155 and the output of the analog to digital converters 150 and 155 outputs are delivered to the processor 115. As described in more detail below, the downhole logging tool 10 is operable to deliver acoustic pulses and sense the returning pulses from various structures. Thereafter, the downhole 10 and/or the surface electronics 15 perform either spectral analysis or time domain analysis or both of those signals in order to discriminate signal returns from the casing and cement that propagate back through the tubing 20. In this regard, a storage device 160 can be positioned in the electronics sub 90 and store spectral analysis computer code and time domain analysis computer code such that the processor 115 can run the spectral analysis computer code/instructions and/or the time domain analysis computer code/instructions to perform the spectral and time domain analyses to be described in more detail below. The storage device 160 can be a variety of non-transient computer readable media, such as a solid state device, such as flash, ROM, or other non-volatile storage. In other arrangements, the storage device 160 need not be positioned on board the electronics sub 90 but may instead be associated and operate with the surface electronics 15 and processor 17 shown in FIG. 1, and this may be appropriate where the cable 13 is a wire line and thus permits two-way real time communication between the surface electronics 15 and the downhole logging tool 10. Optionally, one-way communication can be used. Of course, disk-based hard drives, optical drives or others can be used for the storage device 160 for surface applications. In other arrangements where the cable 13 is a slick line then it is appropriate to position the storage device 160 in the electronics sub 90 to provide for the capability of doing data processing downhole or simply storing acquired data for surface retrieval and processing. Various levels of integration are envisioned. For example, in lieu of dedicated channels (i.e., dedicated amplifiers, filters and phase measure/amplitude measure blocks for each transmitter and receiver) single driving and reception circuitry may tie to multiple receivers by way of one or more multiplexers. In addition, the filtering, driving and other signal processing may be integrated into one, a few or many integrated circuits and devices.

Figure 3:
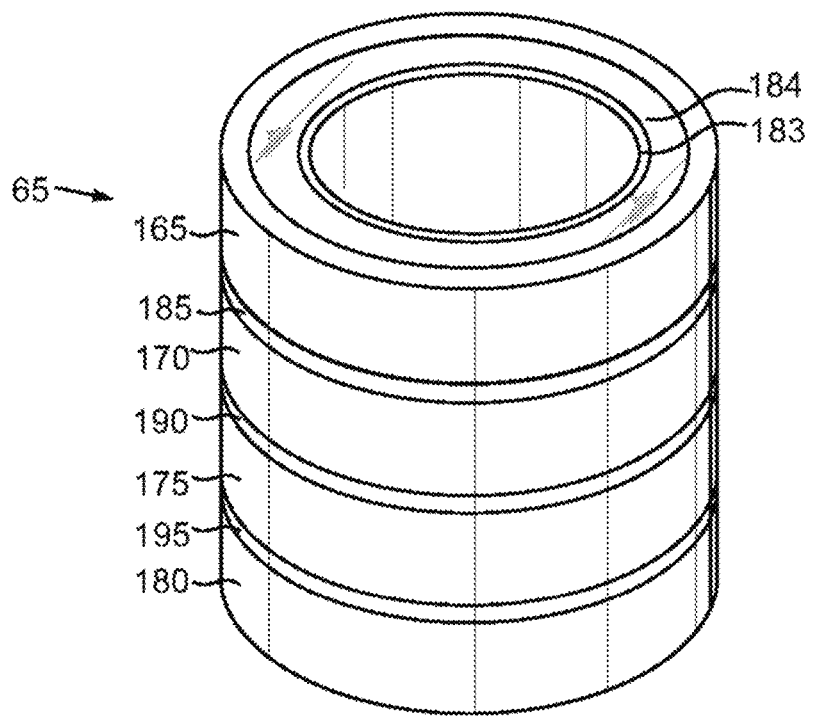
FIG. 3 is a pictorial view of an exemplary acoustic transmitter.

As noted above, one exemplary arrangement of the transmitter 65 can include plural annular piezoelectric elements. In this regard, attention is now turned to FIG. 3, which is a pictorial view of an exemplary arrangement of the transmitter 65, which can include plural stacked piezoelectric elements 165, 170, 175 and 180 positioned on a mandrel 183. A cylindrical shell 184 of, typically, molded silicone is disposed between the mandrel 183 and the piezoelectric elements 165, 170, 175 and 180. The mandrel 183 can be a machined component fabricated of aluminum, for example. The piezoelectric elements 165 and 170 are separated by a resilient gasket 185. The piezoelectric elements 170 and 175 are similarly separated by a resilient gasket 190 and the elements 175 and 180 separated by a resilient gasket 195. The piezoelectric elements 165, 170, 175 and 180 are connected to various electrical leads (not shown) such that the transmitter 65 can be fired using one or more of the elements 165, 170, 175 and 180 in various combinations in order to deliver particular frequencies of interest.

Figure 4:
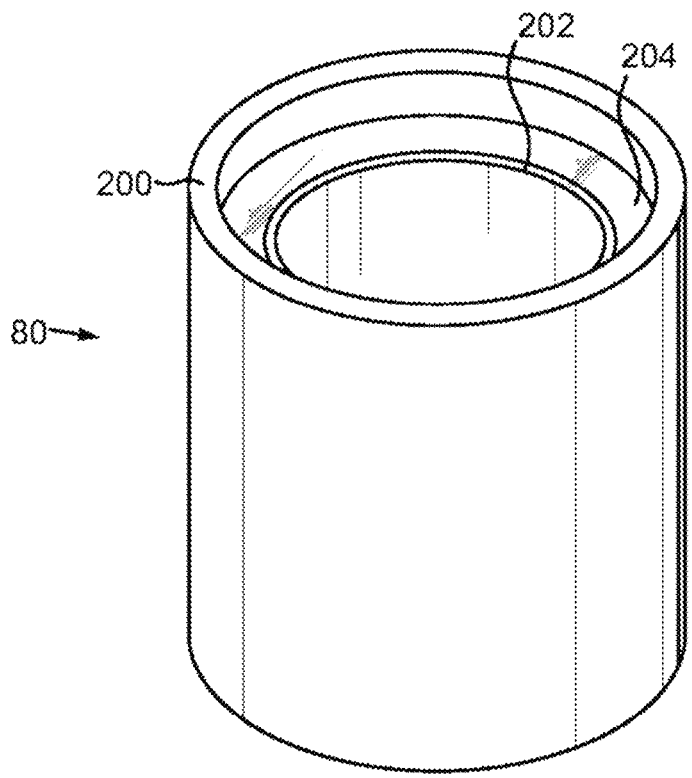
FIG. 4 is a pictorial view of an exemplary acoustic receiver.

The following description of the receiver 80 will be illustrative of the other receiver 85. An exemplary arrangement of the receiver 80 is illustrated in pictorial form in FIG. 4. Here, the receiver 80 can include a single annular cylindrical shell piezoelectric receiver element 200 that is slipped over on a mandrel 202. A cylindrical shell 204 of, typically, molded silicone is disposed between the mandrel 202 and the piezoelectric element 200. The mandrel 202 can be a machined component fabricated of aluminum, for example. Optionally and as noted above, the receiver 80 could be configured as a multi-element azimuthally spaced element receiver to provide azimuthally sensitive reception.

The connector section 60, the acoustic isolator 75, the electronics sub 90 and the lower connector section 95 can be constructed of mechanically durable materials, such as carbon steels, stainless steels, alloy steels or others. Of course, the acoustic isolator includes polymeric materials to break up the longitudinal acoustic pathway of the tool 10. The metallic components of the downhole logging tool 10 and any disclosed alternatives may be fabricated by forging, casting, machining, welding, combinations of these or others. The polymeric or otherwise synthetic components may be fabricated by molding, machining, welding combinations of these or others.

Figure 5:
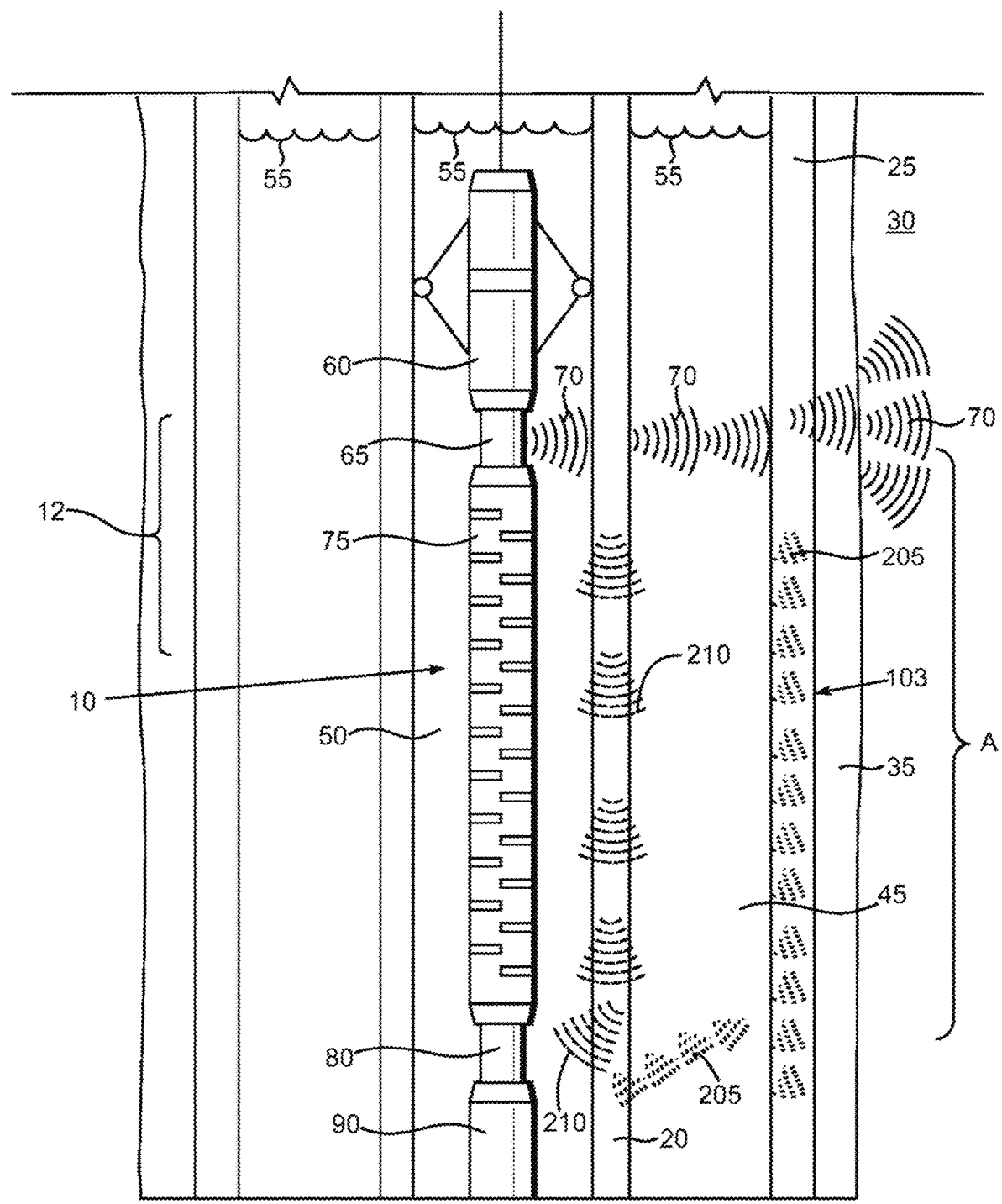
FIG. 5 is a sectional view like FIG. 1, but without hatching and depicting acoustic wave behavior in a cased and cemented well.

A qualitative description of some exemplary interrogation of the interface 103 between the cemented annulus 35 and the casing 25 of the well 12 will now be provided in conjunction with FIG. 5, which is a sectional view similar to FIG. 1, but including only an upper portion of the downhole logging tool 10 that includes the transmitter 65, one of the receivers 80, the acoustic isolator 75 and the connector section 60 and a portion of the electronics sub 90. For simplicity of illustration and such that acoustic pulses can be better visualized, the cross hatching shown in FIG. 1 is omitted in FIG. 5. Assume for the purposes of this illustration that the cement interface 103 at location A constitutes a good bond. In this circumstance, the emitted acoustic pulses 70 from the transmitter 65 propagate through the fluid 55 in the tubing 20, then into the tubing 20, then through the annular space 45 and into the casing 25. Since the cement bond is good at position A, the emitted acoustic pulses 70 propagate readily past the interface 103 into the cemented annulus 35 and propagate up and down and laterally into the formation 30. Some of the acoustic energy will propagate down the casing 25 in the form of acoustic vibrations 205. These acoustic vibrations 205 not only propagate down the casing 25 but also back through the annular space 45 and ultimately to and then inside the tubing 20. Some of the emitted acoustic pulses 70 will ring the tubing 20 and produce high speed propagating acoustic vibrations 210 which propagate in both directions in the tubing 20 and eventually are received back across the annular 50 of the tubing 20 and are picked up by the receiver 80. The propagating acoustic vibrations 210 will tend to arrive at the receiver 80 first before the vibrations 205 from the casing 25, and far in advance of any fluid arrivals from the annular space 45, and indeed the receiver 80 will pick up a series of arriving pulse strings some from the tubing itself 20, some from the casing 25 and some from the fluid 55 in the annular space 45 and the tubing annular 50. Due to the large acoustic impedance contrast between the steel tubing 20 and the fluid 55, the acoustic waves 70 emitted from the tool 10 are primarily confined inside the tubing 20 and the fluid 55 inside the tubing 20. Thus only a very small amount of acoustic energy can be transmitted through the tubing 20 to the casing 25 and back.

Figure 6:
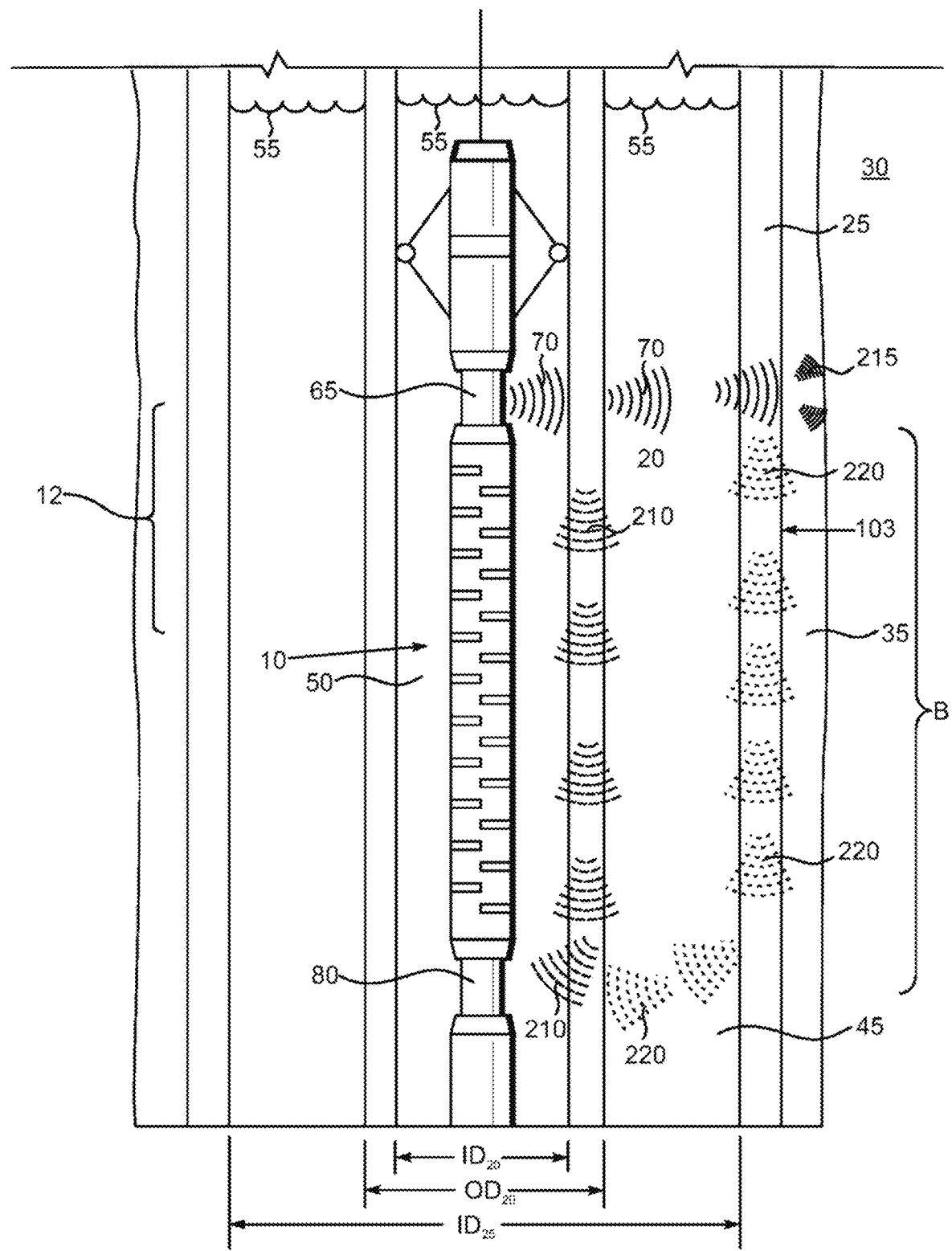
FIG. 6 is a sectional view like FIG. 5, but depicting additional acoustic wave behavior in a cased and cemented well.

A qualitative description of another scenario involving the transmission and reception of acoustic vibrations can be understood by referring now to FIG. 6, which is a sectional view like FIG. 5, but here where the downhole logging tool 10 has moved to a different location in the well 12 and the emitted vibrations 70 are at location B. Assume for the purposes of this illustration that the interface 103 at location B is a bad bond between the casing 25 and the cemented annulus 35. Here, the emitted acoustic vibrations 70 again pass into and through the tubing 20 across the annular space 45 and engage the casing 25 and encounter the poor quality cement bond at location B. Instead of propagating readily through the cemented annulus 35 and out into the formation 30, there is poor acoustic linkage at point B and thus only small amplitude and vibrations 215 pass into the formation 30 from the cemented annulus 35. Instead, there is significant acoustic coupling directly into the casing 25 of acoustic signals 220 which propagate in both directions through the casing 25 and eventually across the annular space 45 and encounter the tubing 20 and are picked up by the receiver 80. In addition, there is the same propagating vibrations 210 in the tubing 20 which will, as in the previous example, tend to arrive first at the receiver 80 prior to the returning vibrations 220 that are propagating through the casing 25. Again, the techniques and structures disclosed herein are designed to pick out and discriminate the vibrations 220 which would otherwise be swamped by the vibrations 210.

Figure 7:
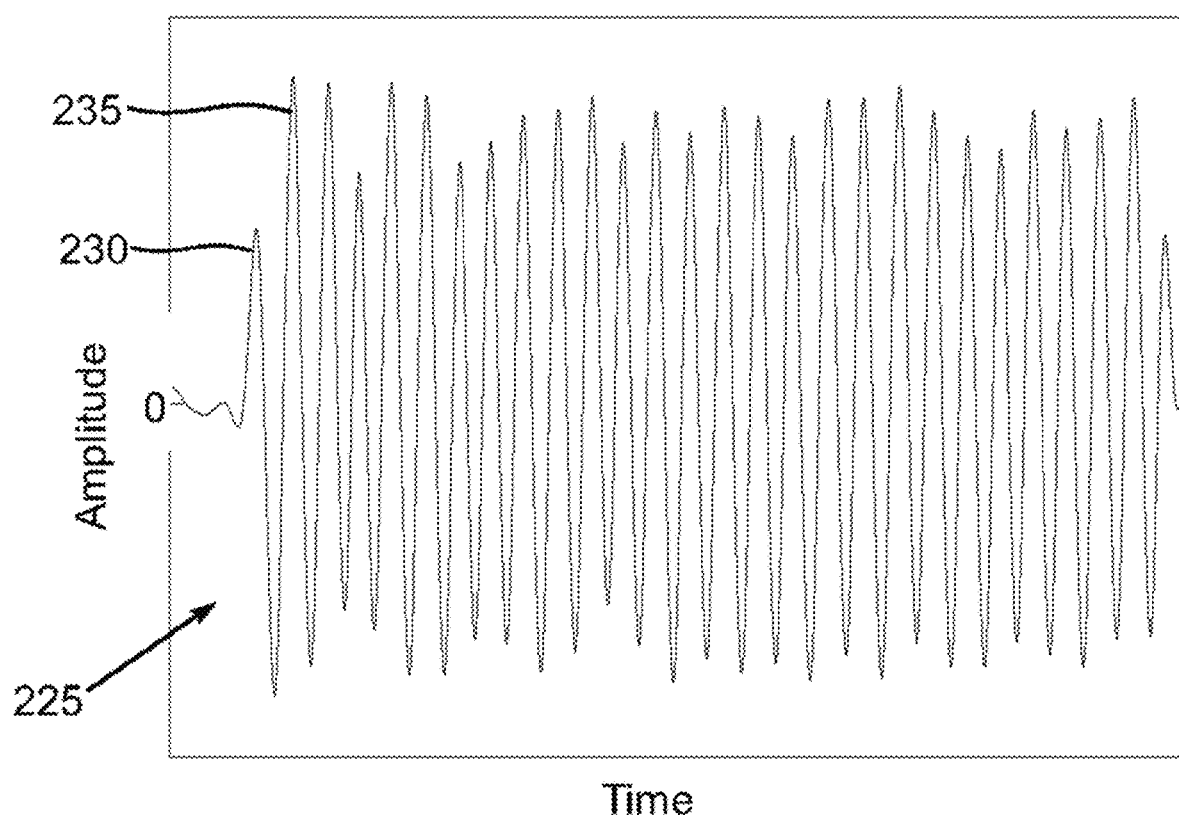
FIG. 7 is a plot of acoustic energy received at a receiver.

FIG. 7 is a plot of amplitude versus time of the acoustic waves received at the receiver 80 and is representative of either the scenarios represented in FIGS. 5 and 6 discussed above. In either of the FIG. 5 and FIG. 6 scenarios, the wave form 225 is dominated by the waves 210 traveling through the tubing 20. Of course it should be noted that in conventional cement bond logging, only the first peak 230 (commonly abbreviated "E1") or perhaps another very close peak 235 is used to evaluate the quality of the cement bond. However, the conventional CBL technique of looking at the amplitude of the first peak 230 will not work with a tubing 20 present since the first arrival is only through the path traveling down the tubing 20 and contains information about the condition of the cement bond at the interface 103. As described in more detail below, the apparatus and methods disclosed herein enable the operator to discriminate the vibrations 205 from the casing 25 from the vibrations 210 which ordinarily arrive first to the receiver 80 and are also of much greater amplitude and would otherwise tend to swamp the vibrations 205.

Figure 8:
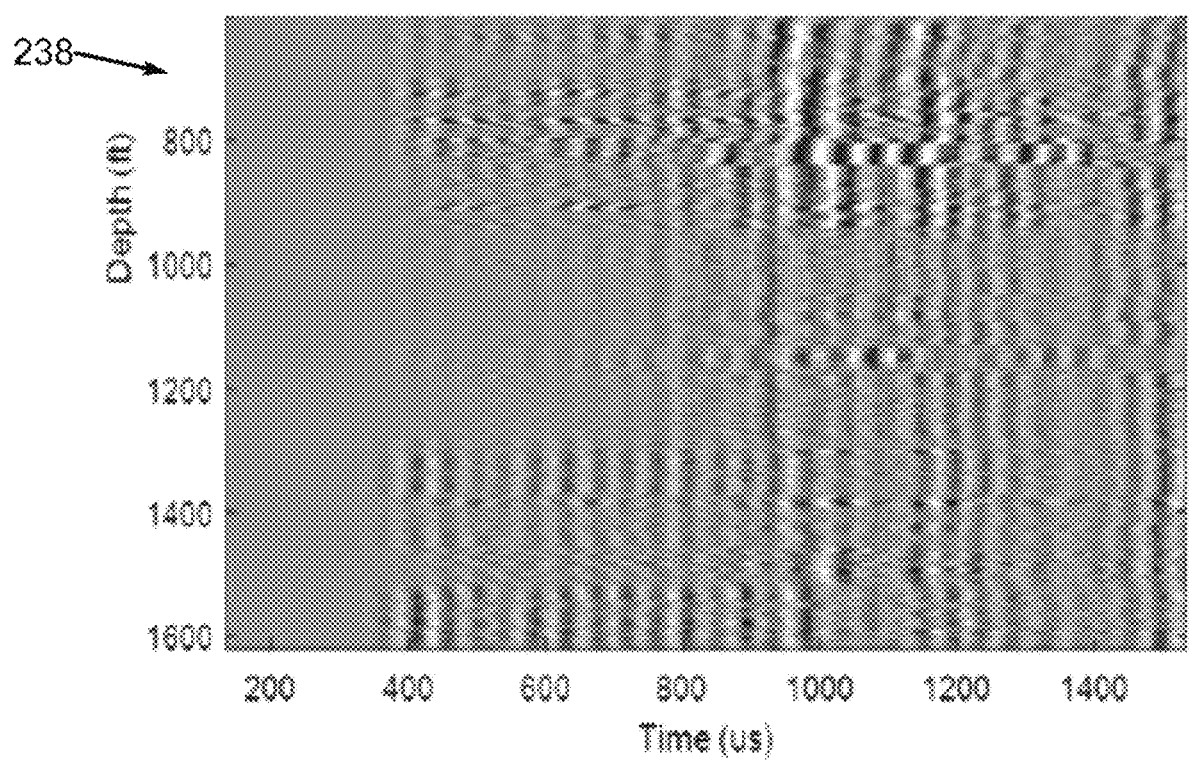
FIG. 8 is variable density log (VDL) format plot of waveforms received at a receiver without tubing present.

The disclosed techniques seek to identify and quantify signatures of cement bond quality sensed by an acoustic receiver inside a tubing. One technique uses spectral analysis of returned acoustic signals. Other techniques use time domain analysis of returned acoustic signals. The spectral analysis technique will now be described. Initially, one or more acoustic frequencies where acoustic amplitudes of returning signals are noticeably affected by cement bond quality are identified. The identification and preselection of frequencies of interest is a multi-pronged process. Initially, CBL logs of an exemplary well with and without a tubing present and at depths with known good cement bonds and depths with known bad cement bonds are obtained. Initially, a CBL log is obtained for a well, such as a test well with known properties, a tubing set up for calibration purposes or even the well 12 shown in FIGS. 1, 5 and 6 if its properties are already known. The CBL log is obtained by running the tool 10 without tubing and at depths with known good cement bond and depths with known bad cement bond. Referring to FIG. 6 again, the well 12 will have a known configuration in terms of the size of the tubing 20 (e.g., $OD_{20}$, $ID_{20}$), the size of the casing 25 (normally represented by $ID_{25}$ and a weight casing weight per foot) and the composition of the fluid 55, such as fresh water, salt water, with or without mud or other drilling fluids. An exemplary CBL log 238 for an exemplary well over a depth range of 600 to 1600 feet, a data acquisition window of 0 to 1600 µs, and waveforms received at the upper receiver 80, is represented graphically in variable density log (VDL) format in FIG. 8. In FIG. 8, areas with little white represent areas with relative low amplitudes of returning acoustic energy and areas with more white represent high amplitudes of returning acoustic energy. It is anticipated that acoustic arrivals from the fluid 55 occur starting at around 625 µs, and this is after the arrivals of interest associated with the cement interface 103. Accordingly, interpretation is focused at the time period before the arrivals of the fluid 55, i.e., before 625 µs. It is evident from FIG. 8 that the cement bond at the interface 103 is substantially good from about 900 ft. to 1280 ft., but substantially bad in two sections: about 1300 ft to about 1470 ft and about 1510 ft to about 1600 ft.

Figure 9:
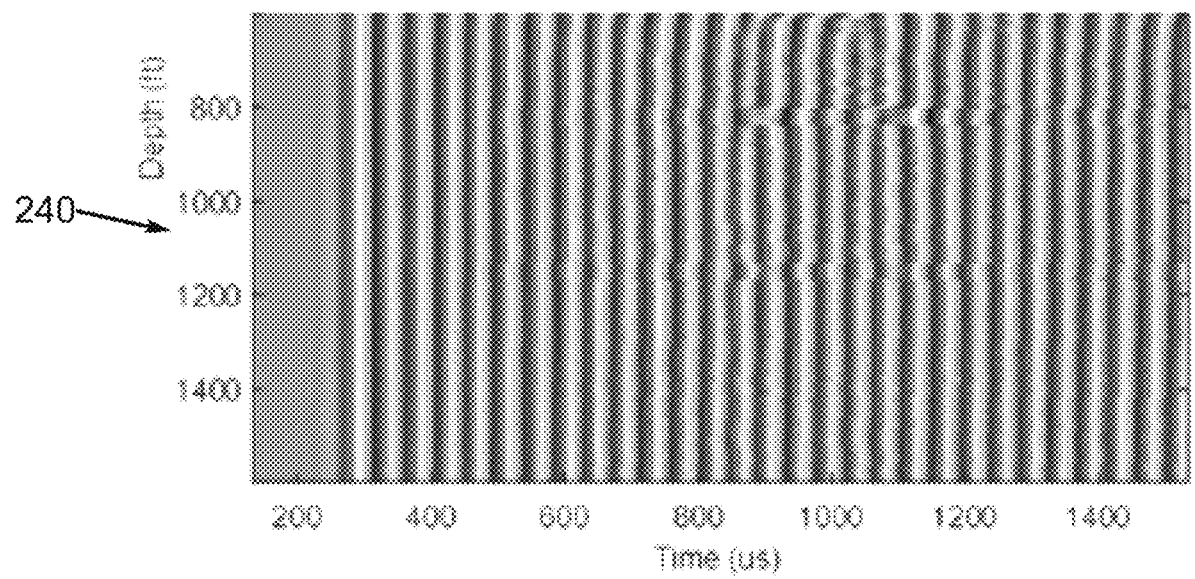
FIG. 9 are variable density log format plots of waveforms received at a receiver with tubing present and centered and non-centered.
Figure 9:
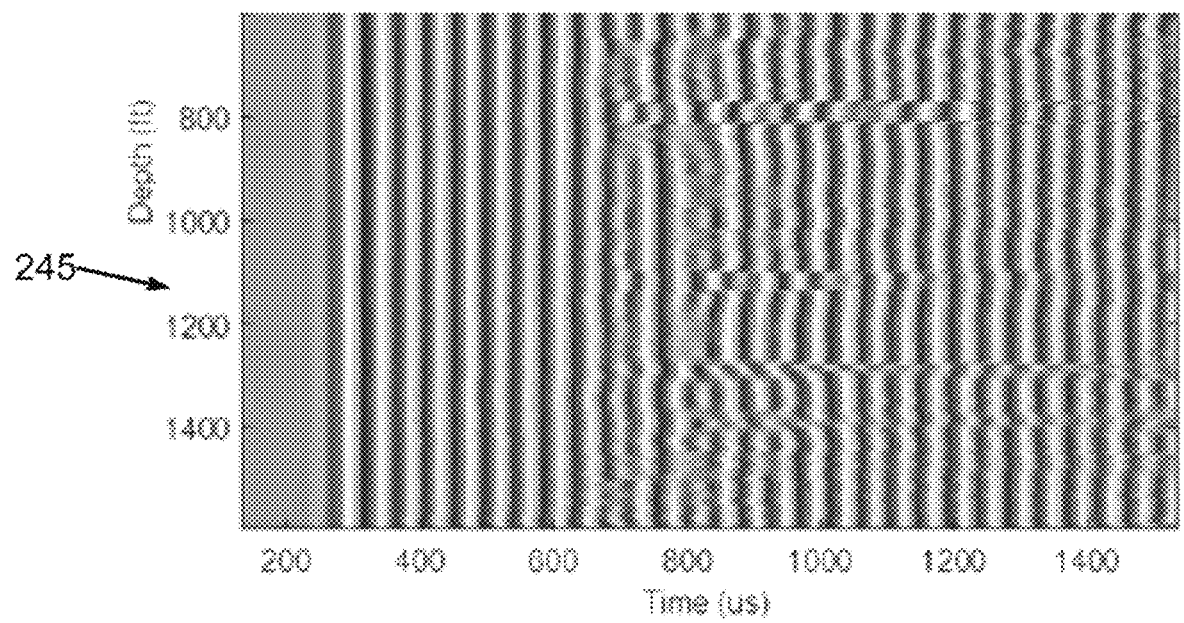
Figure 10:
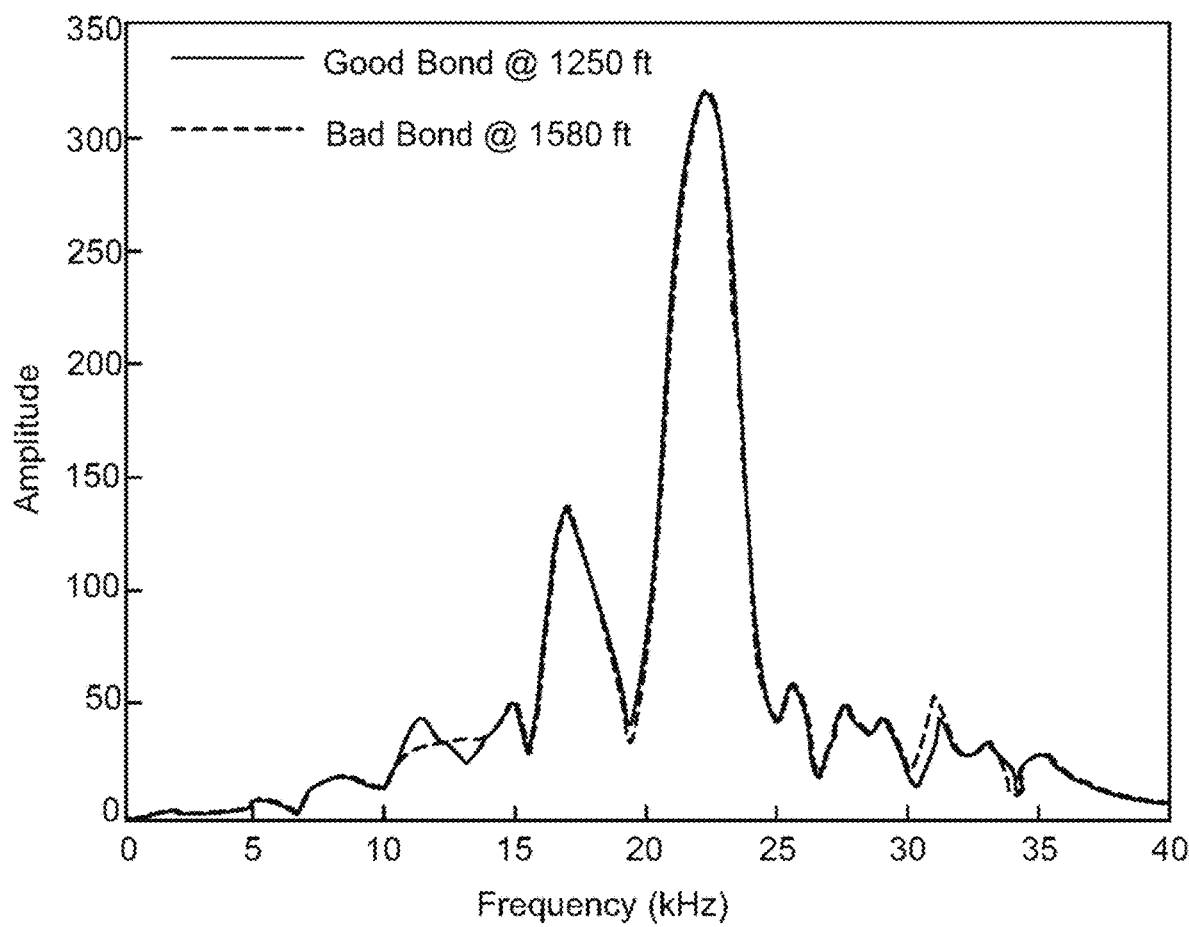
FIG. 10 is a frequency spectrum for a known good bond location and a known bad bond location.

With the FIG. 8 log 238 and accompanying data in hand, another cement bond log over the same depth range is obtained with the tool 10, but this time with the tubing 20 present. Applicants have discovered that the tubing 20 does not have to be centered in the casing 25 in order to obtain useful data. In actual practice, the tubing 20 is often eccentric in the casing 25. However, two CBL logs can be obtained: one CBL log with the tubing 20 centered in the casing 25 and another CBL log without such centering. Exemplary CBL logs 240 (centered) and 245 (un-centered) for a well over a depth range of 600 to 1600 feet, a data acquisition window of 0 to 1600 µs, and data received at the upper receiver 80, are represented graphically in variable density log (VDL) format in FIG. 9. At first blush, little stands out about the CBL log 240. With the known CBL log 238 in hand, two depths are selected for spectral analysis of the waveforms of the CBL log 240. Here, a depth of 1250 ft where there is a known good bond and a depth of 1580 ft where there is a known bad bond are selected. The spectra of the waveforms from the CBL log 240 at the two depths 1250 ft and 1580 feet are calculated using a transform technique, such as a Fourier transform, a Fast Fourier transform (FFT) or other technique to transform data from time domain to frequency domain. FIG. 10 depicts a frequency spectrum plot for a good bond at 1250 ft overlapped with a frequency spectrum plot for a bad bond at 1580 ft for the CBL log 240 data prior arrivals from the fluid 55 (before 625 µs). The differences on waveforms are subtle but visible. Discrepancies appear at a few certain peaks. For example, there are discrepancies at frequency ranges around 10 to 13 kHz and around 30 to 33 kHz. It is believed that the peaks around 21 kHz and 23 kHz are mainly caused by the tubing 20 and the peaks near around 10 kHz to 14 kHz and again 18 kHz to 19 kHz are indicative of the cement interface 103. The peaks at frequency range around 10 kHz to 13 kHz are the locations of the maximum difference between the good and the bad spectra. Thus, the frequency range of 10 to 13 kHz contains one or more frequencies where the acoustic amplitude is noticeably affected by cement bond quality. One or more frequencies of interest can be selected from the frequency range of 10 to 13 kHz to create logs of amplitude as a function of depth. The frequencies of interest are akin to natural frequencies of the casing 25 at locations of poor cement bonding.

Figure 11:
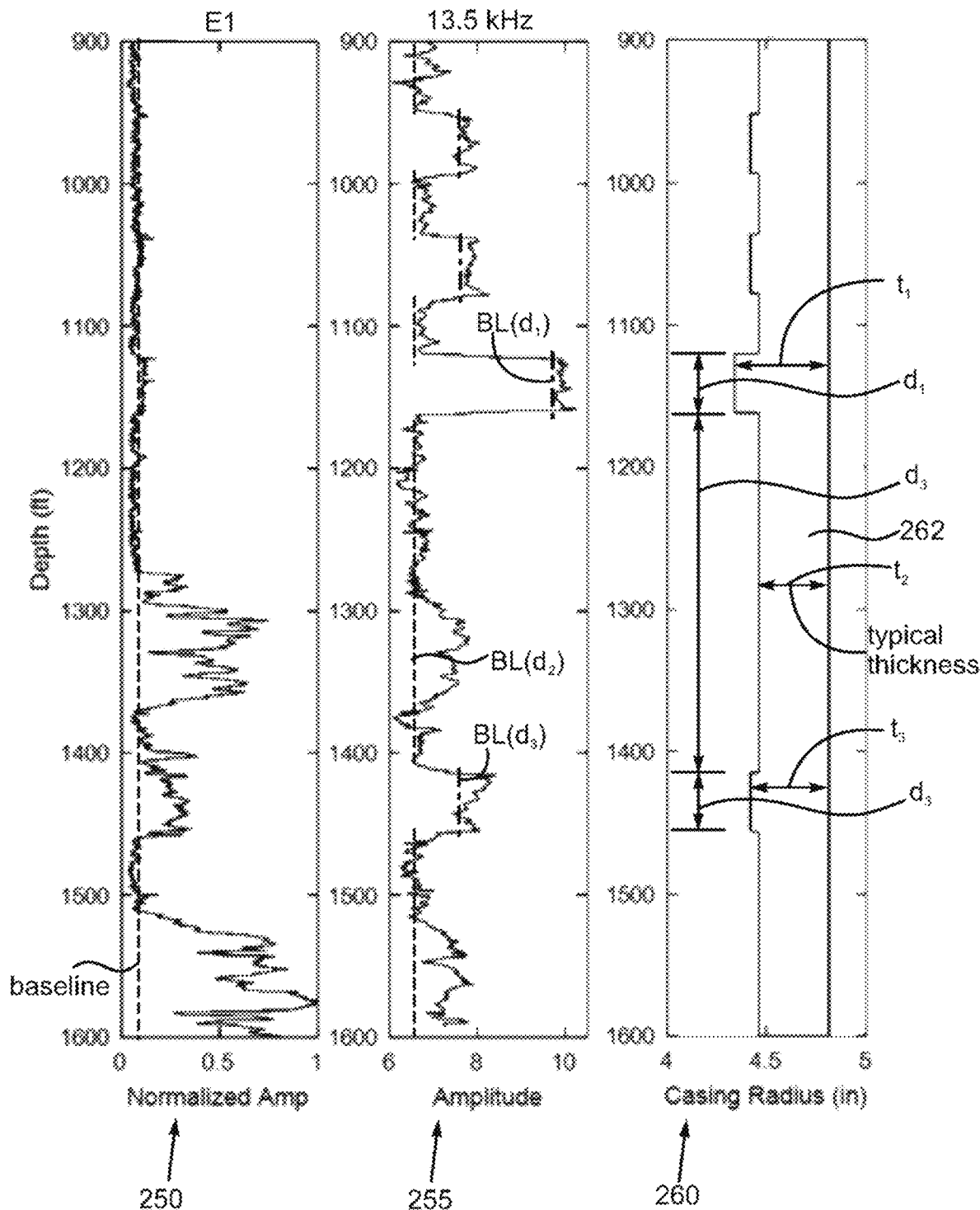
FIG. 11 depicts amplitudes versus depth for no tubing and through tubing data at a frequency of interest.

Assume for the purposes of this example that the spectral analysis plots in FIG. 10 suggest a frequency of interest of 13.5 kHz, which is inside the 10 kHz to 13 kHz range of maximum difference. A log of amplitude as a function of depth for the frequency of interest (and with the tubing 20 present) can be created and compared with a corresponding log of amplitude versus depth without the tubing 20 and based on the first peak 230 (or E1) shown in FIG. 7 or somewhere around 400 µs in FIG. 8. For example, FIG. 11 depicts two logs 250 and 255. The first log 250 is taken from the data associated with the VDL shown in FIG. 8 and shows relative amplitude versus depth for first peak 230 (or E1) and no tubing. The next log 255 is scaled (normalized) amplitude versus the same depth range but focused on the 13.5 kHz frequency of interest. Both logs 250 and 255 focus on the time period prior to the arrivals associated with the fluid 55 (see FIG. 6). FIG. 11 also includes a log 260 of casing radius versus the same 900 to 1600 ft depth range. The logs 250 and 255 do not need to use exactly the same depth range, but the depth ranges of both do need to at least partially overlap enough to provide a basis for comparison. As is evident from the log 260, the casing 262 does not have a uniform thickness. Indeed, there are several locations where the casing 262 is thicker than the typical thickness. For example, the locations 263 and 264 (and two others not labeled) have larger thicknesses than the majority of the casing 262. The locations 263 and 264 will consequently be regions where the casing 262 is heavier than other regions where the casing thickness is typical. In the conventional CBL 250, a baseline amplitude for identifying the bad bond is available. The baseline can be taken from the average amplitude over a depth range of known good bond or from known industry standard baselines based on free pipe calibration. For log 250 that depth range is about 900 ft to 1200 ft. Once the E1 amplitude is significantly greater than the baseline value, the bond can be identified as bad. At depth range around 1280 ft to 1400 ft, the conventional CBL 250 indicates a bad bond zone and again at around 1520 to 1600 ft. The baseline situation for the log 255 is somewhat different due to variations in casing thickness and thus casing weight. Casing thickness is commonly represented by casing weight/unit length, usually in lbs./ft. Casing joints, among other things, can cause such variations. For example, at the depth range $d_1$, there is a casing thickness $t_1$ that is increased relative to the typical thickness $t_2$ due to a casing joint, at depth range $d_2$ the casing 262 has the typical thickness $t_2$, and at depth range $d_3$, the casing 262 again has a thickness $t_3$ increased relative to the to the typical thickness $t_2$ due to another joint and so on. The baseline amplitude $BL(d_1)$ at depth range $d_1$ and the baseline amplitude $BL(d_3)$ are both shifted relative to the baseline amplitude $BL(d_2)$ at depth range $d_2$ and the shifts are proportional to the variations in casing thickness at depth ranges $d_1$ and $d_3$ over the typical thickness. The baselines $BL(d_n)$ can expressed a linear approximation, such as:

$$BL(d_n) = \sigma t(d_n) + \varepsilon \quad (1)$$

where $\sigma$ and $\varepsilon$ are parameters, which can be determine through calibration. As part of the calibration procedure, a main baseline can be established in a similar manner to procedure described above for the log 250, and this main baseline used to solve Equation (1) for the parameters $\sigma$ and $\varepsilon$. With the baselines $BL(d_n)$ in hand, differences between the log 255 and the baselines $BL(d_n)$ can be looked at directly to judge bond quality. Optionally, a new bond quality log (not shown), which will be similar in appearance to the log 250, can be generated by subtracting the baselines $BL(d_n)$ from log 255. Such as subtraction process could be termed a Casing Weight Correction. Regardless of particular baseline presentation technique, the log 255 shows reasonably good correlation with the conventional CBL 250 in that the log 255 shows significant deviations from the shifted baselines $BL(d_n)$ approximately the same depths as the conventional CBL 250.

Figure 12:
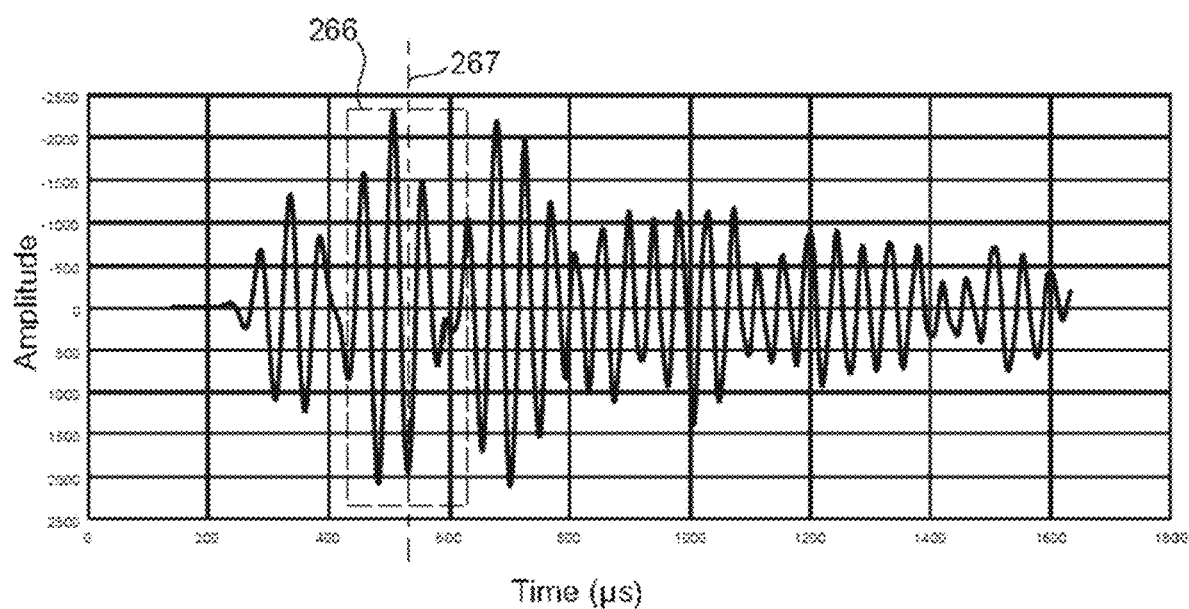
FIG. 12 depicts an exemplary received waveform and selected wave segment and time window.
Figure 13:
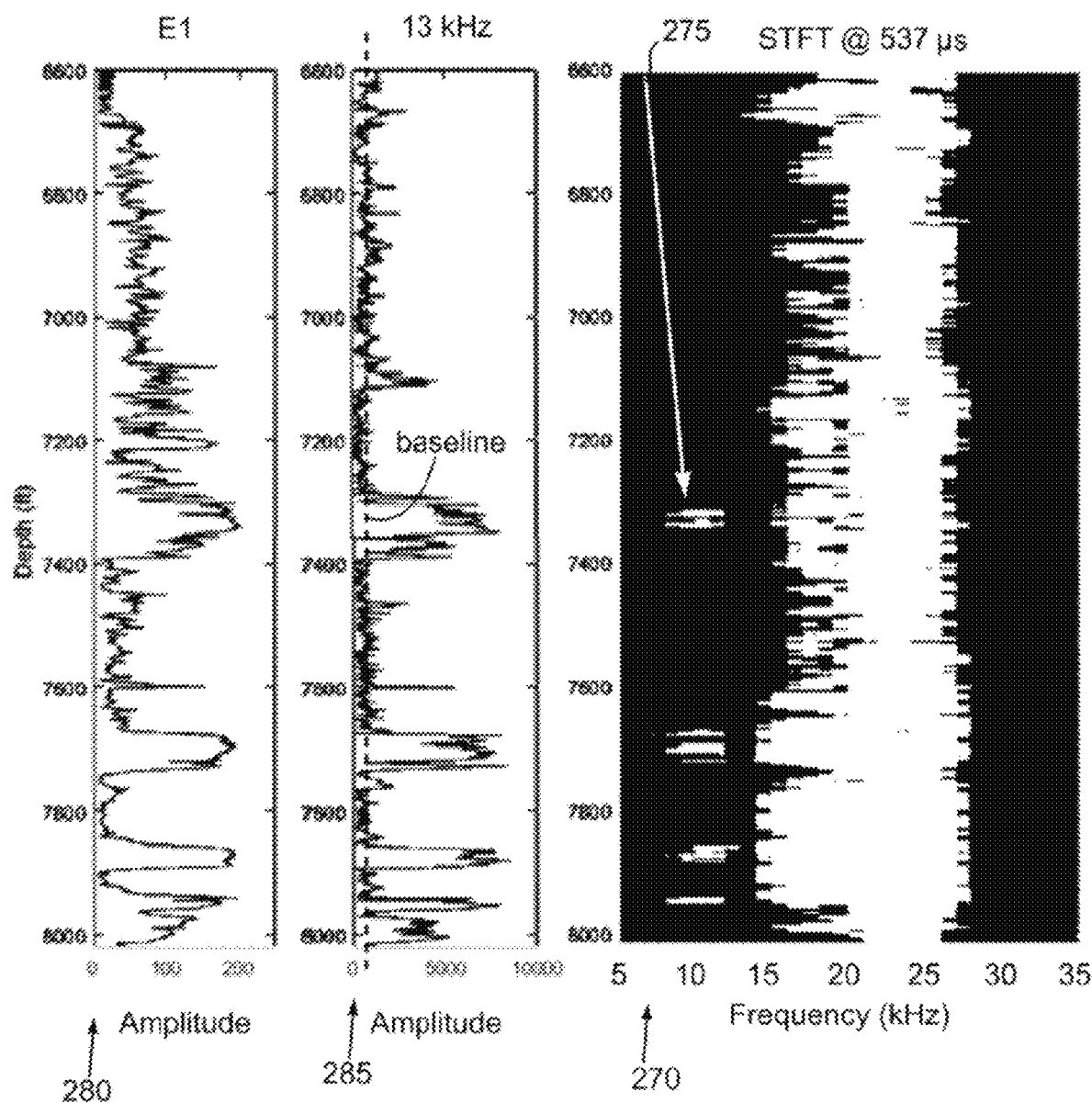
FIG. 13 depicts exemplary logs amplitudes versus depth for no tubing and for amplitude versus depth at a frequency of interest along side a VDL plot of received waveforms for a selected wave segment and time window.

Another exemplary method uses less than a whole waveform for analyzing cement bond quality through tubing. Instead of analyzing the spectrum of the whole waveform as described in conjunction with FIGS. 8-11, an exemplary short time frequency analysis divides the whole waveform into shorter segments, such as wave segment 266 of the waveform shown in FIG. 12. As the extra waves from a poorly bonded casing arrive at the receiver at certain time periods, short time frequency analysis can enhance the detection these waves by focusing on analyzing the wave segment(s) 266. Here, the wave segment 266 is selected to have a length of 200 μs and a center 267 at 537 μs. Of course, other or additional segments could be chosen with other lengths and centers. Spectrum analysis by way of a Fourier or other transform is performed separately on each wave segment(s). In each spectra from a selected wave segment(s) 266, the most sensitive frequencies to vibrations of the unbonded casing are identified for evaluation of the cement bond quality. For example, a STFT of the wave segment 266 with a length 200 μs and a center at 537 μs yields the spectrum 270 in FIG. 13 in spectral image format. The analyzed waveform is for a through tubing set up. Note the depth range of 6,600 ft to 8000 ft. FIG. 13 suggests 13 kHz as a frequency of interest. Note the signals 275 present at between about 8 kHz and 14 kHz at depths of 7300 ft, 7700 ft, 7900 ft and 7980 ft and note how these signals 275 stand out. In other words, acoustic amplitude is noticeably affected at a frequency range between about 8 kHz and 14 kHz. With a 13 kHz frequency chosen, logs 280 and 285 with the same format as those in FIG. 11 can be generated and are shown in FIG. 13. The first log 280 is amplitude versus depth (6,600 ft to 8,000 ft) for the first arrival peak E1 in a conventional CBL log with tubing for comparison purposes. The next log 285 is inside tubing and amplitude versus the same depth range but focused on the 13 kHz frequency of interest. In the conventional CBL 280, cement bond quality is clearly poor at 7300 ft, 7700 ft, 7900 ft and 7980 ft. Note the corresponding jumps in amplitude in the log 285 relative to a baseline, suggesting good agreement with the conventional log 280. Compared with the CBL log 280 without the tubing, this method shows a very good sensitivity and accuracy. To enhance the accuracy of cement bond evaluation, the amplitude of several frequencies at several wave segments can be combined into an integrated algorithm. Furthermore, this method can be applied to cement bond evaluation through an inner casing or multiple casings with multiple cemented annuli. Note also that casing weight baseline corrections of the type depicted in FIG. 11 can be applied to logs like the log 285 as well where casing weights vary due to joints.

Figure 14:
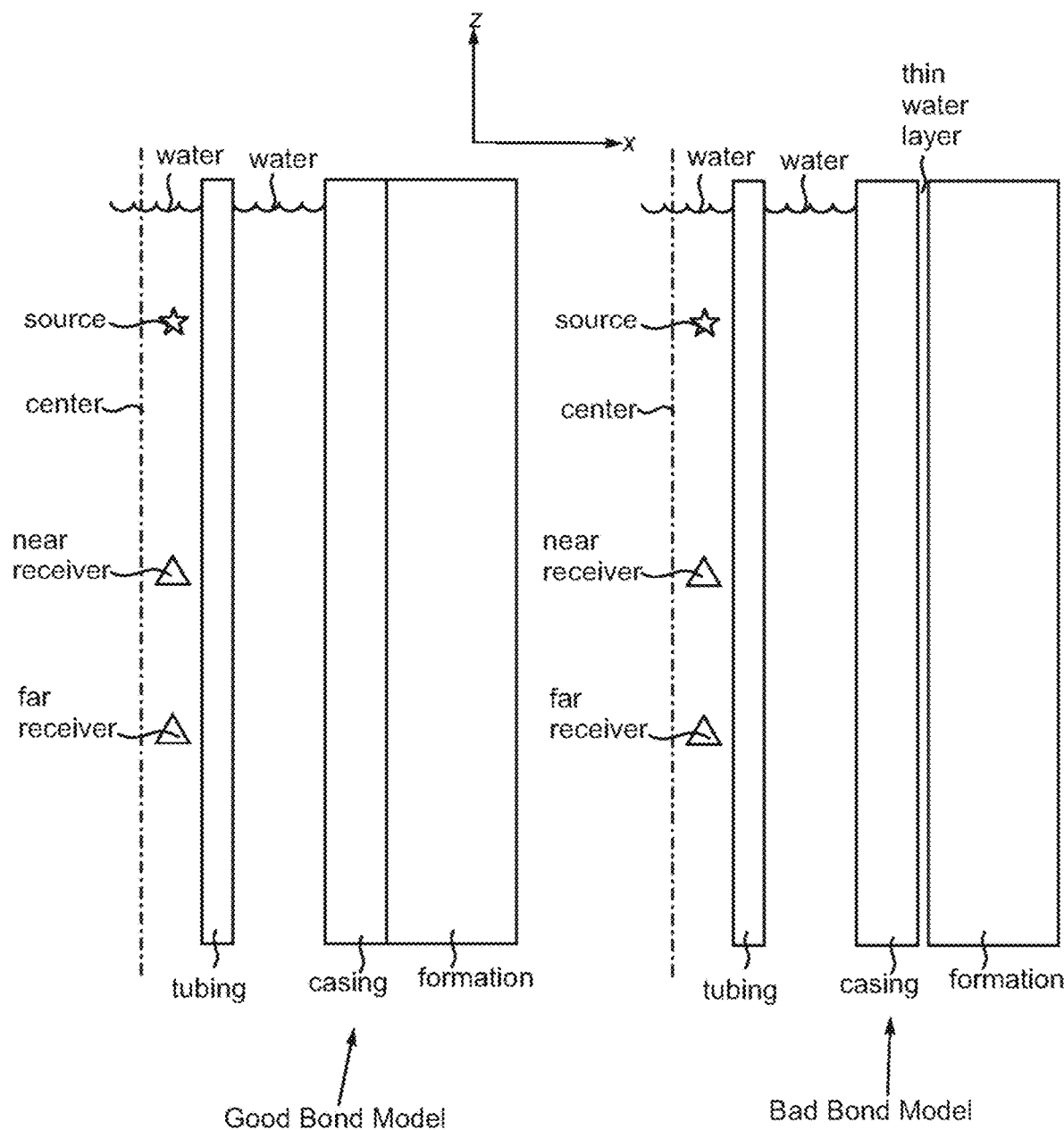
FIG. 14 is a schematic depiction of an exemplary model geometry to model acoustic behavior in tubing and cased well.

The empirically derived data depicted in FIGS. 8-13 just discussed is useful to identify frequencies of interest where acoustic amplitude of returning signals is noticeably affected by cement quality. However, such empirical analysis can be augmented, and in some cases, supplanted by numerical simulation or even analytical calculation. An exemplary modeling procedure will now be described. A goal of the modeling procedure is to duplicate the results observed from tests, such as those that produced the logs in FIGS. 8-13. With a model in hand that accurately replicates the results of actual field testing, future signal responses, when conditions of the well and tubing (such as casing and tubing size) change, can be predicted without the necessity of additional field testing, resulting in savings in time and effort. Exemplary geometries used to model a through-tubing CBL with good and bad bonds are shown in FIG. 14. The left-hand is the good bond model and the right-hand is the bad bond model. The modeling boundary range/dimensions are 10 meters in the z-direction and 3 meters in the radial or x-direction. This model dimension size range is large enough to ignore boundary effects without presenting uncertainties by defining boundary conditions. The good bond model and the bad bond model are axially symmetric. The tool body is disregarded in the model since for simplicity of calculation, and because it should not carry any wave propagation due to the acoustic attenuator/isolator (element 75 in FIG. 1). An acoustic source or transmitter is defined as a ring and placed at radius, relative to the center, of the tool surface. The transmitter spectra is simulated as a narrow bandwidth centered at 18 kHz and with a bandwidth of 15 kHz. Two receivers, a near receiver and a far receiver, are on the tool surface at 3 ft and 5 ft spacings from the source, respectively. The tubing and casing are modeled according to real configurations. All void spaces between media are filled by water. To reflect the bad bond, a thin water layer is positioned between the casing and the formation. The good bond model and the bad bond model are otherwise identical.

Figure 15:
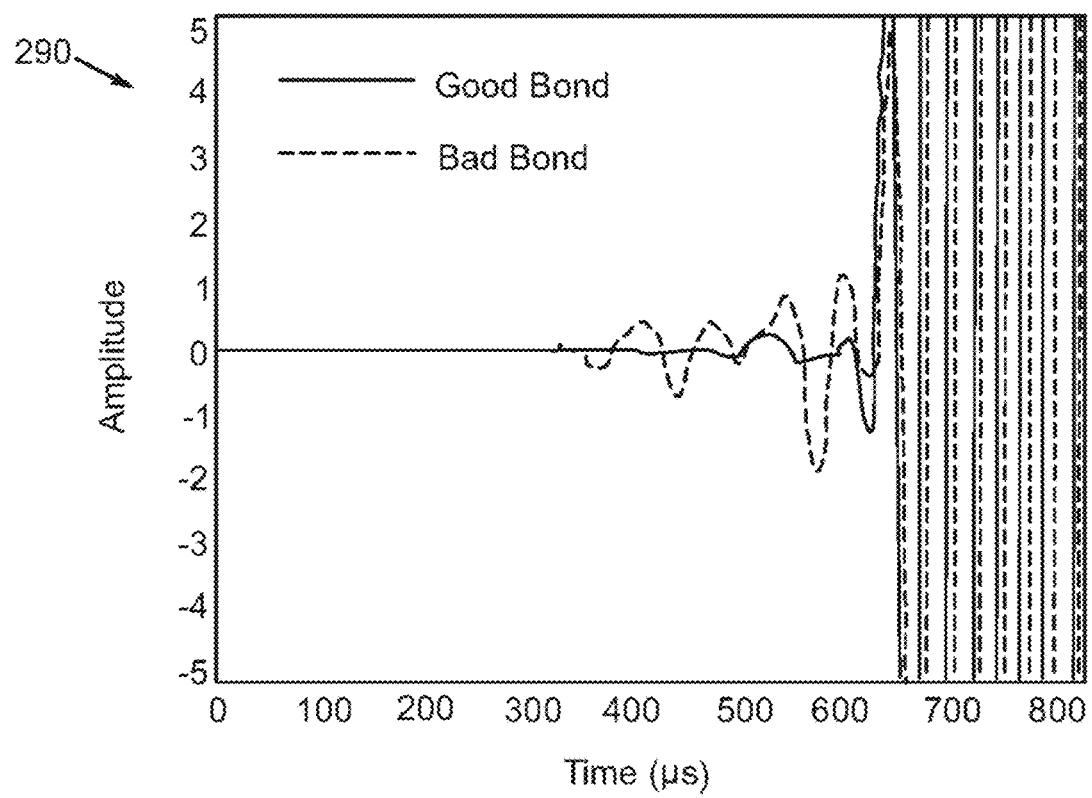
FIG. 15 depicts modeled waveforms for a good cement bond and a bad cement bond and for no tubing and a through tubing models.
Figure 15:
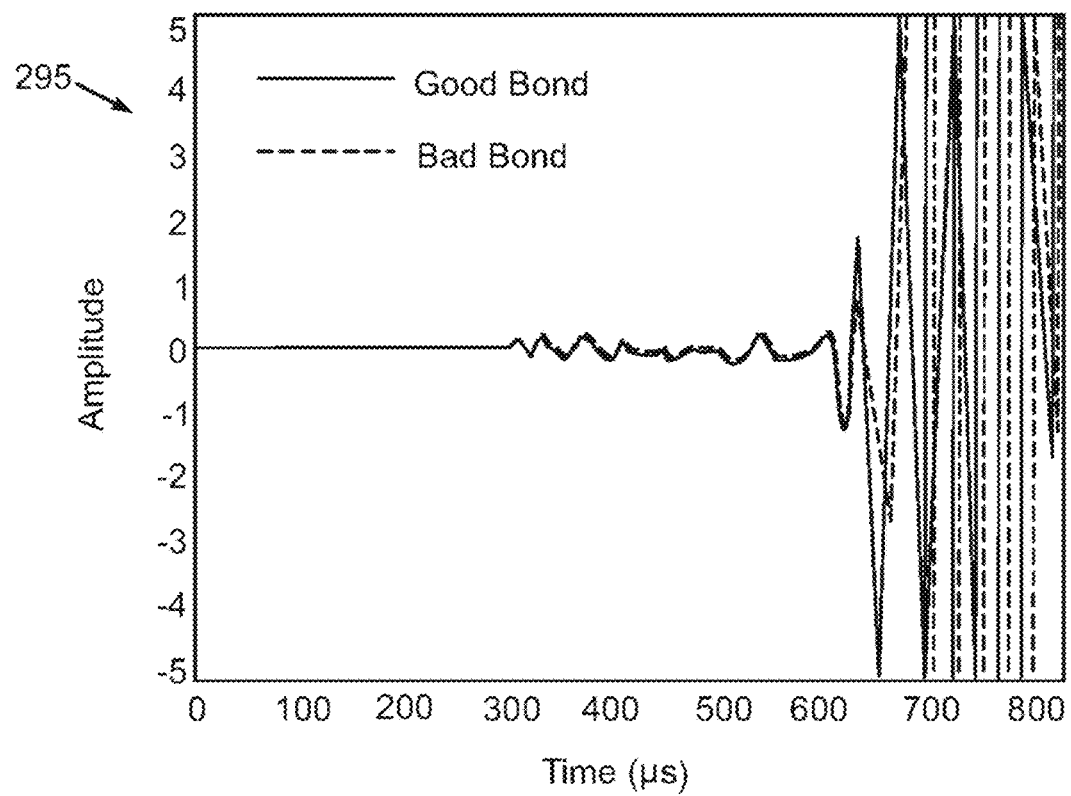
Figure 16:
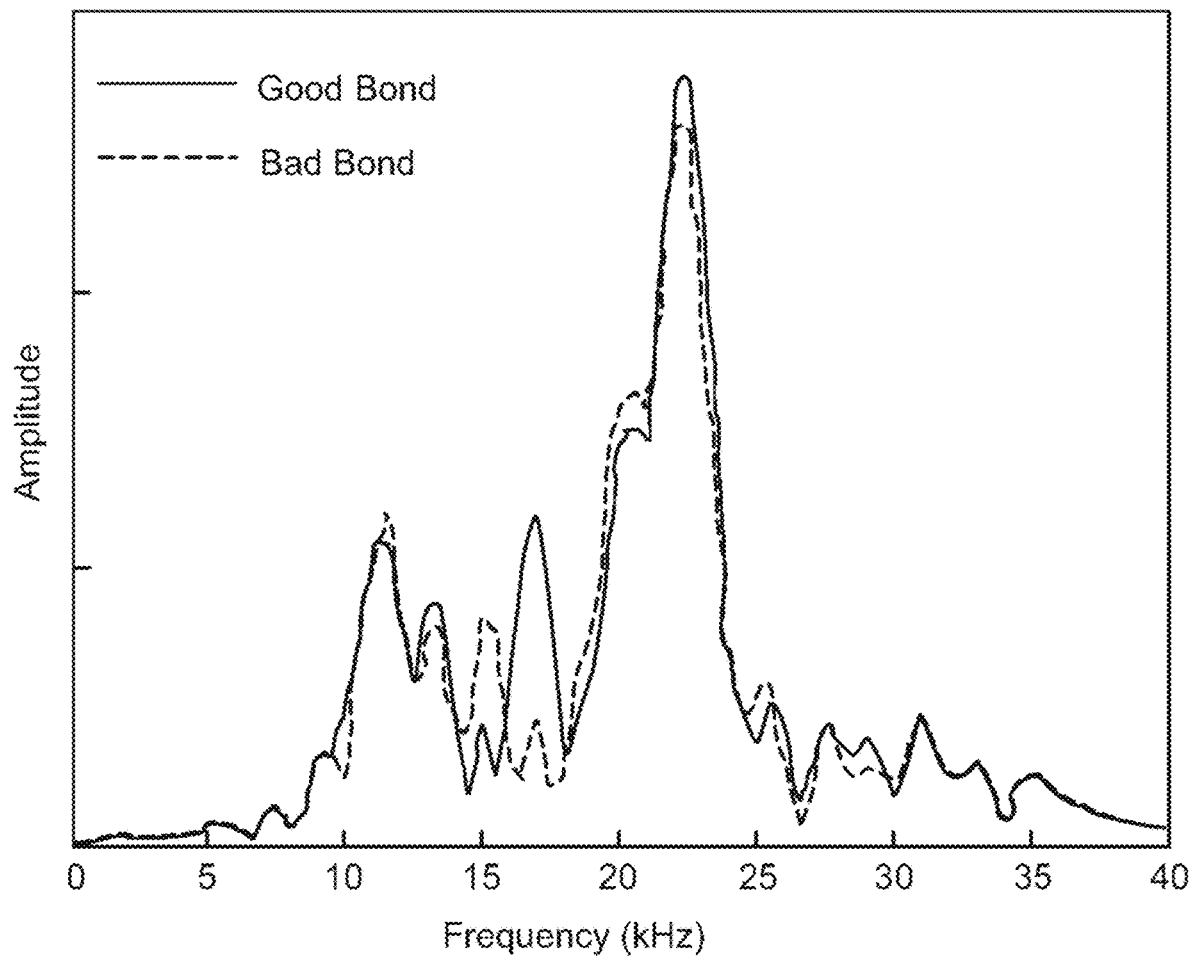
FIG. 16 is a frequency spectrum for a modeled known good bond and a known bad bond.

Still referring to FIG. 14, Eigen value method, finite element, finite difference or other techniques are applied to model the acoustic behavior of the good bond model and bad bond model set ups to produce waveforms sensed by the near receiver with and without the tubing present. For example, FIG. 15 depicts modeled waveform 290 for the near receiver with without tubing and modeled waveform 295 with the tubing. Of course, similar simulated data sets can be generated for the far receiver. For all cases, the water arrivals (after about 650 μs) are pronounced and perhaps stronger than seen through experimentation, probably because the tool body is not simulated in the model. The modeling calculations can be written into computer code in the C programming language, MATLAB or other language. A transform, such as a FFT or other, is applied to the data from the modeled waveform 295 to produce simulated spectra shown in FIG. 16 for a good bond and a bad bond. The discrepancy at frequency peaks, such as around 10 kHz to around 18 kHz agree with the spectra acquired experimentally and shown in FIG. 10. It follows that if changed well conditions are encountered in the same or different well, the model can be adjusted for the new conditions and produce useful results.

Figure 17:
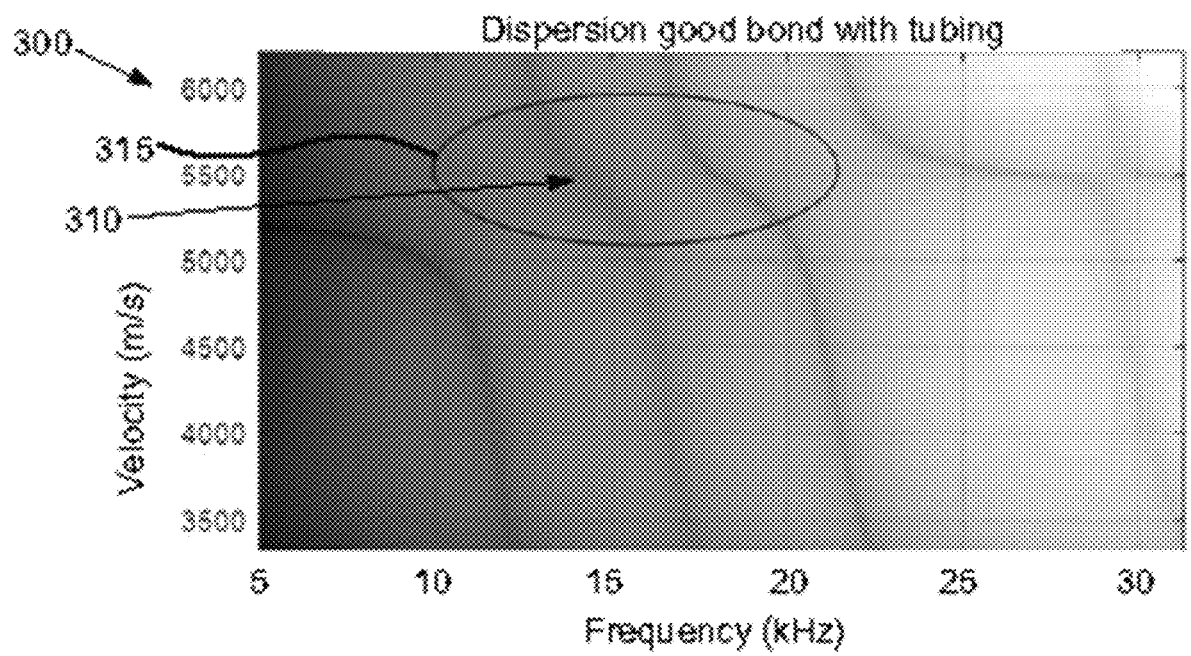
FIG. 17 depict dispersion plots for known good bond with tubing and a known bad bond with tubing.
Figure 17:
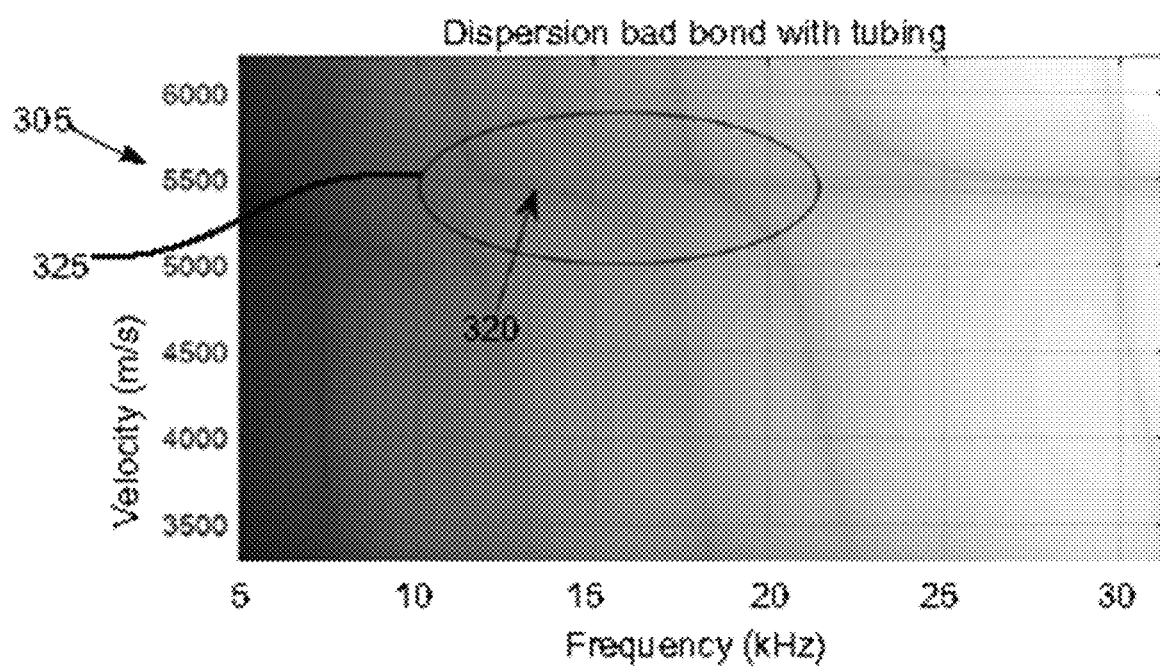

A theoretical approach to preselecting frequencies of interest for logging purposes involves wave dispersion techniques. Wave dispersion plots 300 and 305 shown in FIG. 17 are generated by: (1) treating the tubing-casing-cement structure as a linear system and building an analytical linear equation in matrix form to predict the system output/response to a known excitation source; and (2) calculating the determinant of the coefficient matrix between the excitation and the output, while scanning the acoustic wave phase velocity and frequency. Step (1) involves solving wave equations. Assuming axial symmetry, the wave equations for a given layer n are:

$$\frac{\partial^2 \varphi_n}{\partial r^2} + \frac{1}{r}\frac{\partial \varphi_n}{\partial r} + \frac{\partial^2 \varphi_n}{\partial z^2} = \frac{1}{\alpha_n^2}\frac{\partial^2 \varphi_n}{\partial t^2} \qquad (2)$$

$$\frac{\partial^2 \psi_n}{\partial r^2} + \frac{1}{r}\frac{\partial \psi_n}{\partial r} - \frac{\psi_n}{r^2} + \frac{\partial^2 \psi_n}{\partial z^2} = \frac{1}{\beta_n^2}\frac{\partial^2 \varphi_n}{\partial t^2} \qquad (3)$$

where $\alpha_n$ and $\beta_n$ are the compressional and shear wave velocities, respectively. $\varphi_n$ is the scalar potential and $\psi_n$ is the azimuthal component of the vector potential, the only non-zero component of the vector potential due to the axial symmetry. Assuming as boundary conditions that the source (e.g., the source in FIG. 12 or the transmitter 65 in FIGS. 1 and 5) is positioned at z=0 and r=0, the normal displacement at boundary is continuous, the stress at boundary is continuous and there is zero tangential stress at boundary, Equations (2) and (3) can be solved using well-known techniques to yield a wave pressure at each point, which is related to the source velocity and frequency. Regarding plot interpretation, the lower values of the determinant will produce the higher output amplitude at the corresponding frequency and velocity. Consequently, the dark lines 310 in the region 315 of the plot 300 and the dark lines 320 in the region 325 of the plot 305 indicate the favored system operating modes. From the comparison between the good bond plot 300 and the bad bond plot 305, the poor cement bond would introduce mode variations or extra favored modes near the 11 kHz to 15 kHz range and again at around 18 kHz at sound speed of 5400 m/s (compressional velocity in steel). These analysis results are in reasonably good agreement with the experimental data in FIG. 10.

A technical goal of the foregoing spectral analysis techniques is to identify one or more frequencies of interest is to generate a table of frequency(s) of interest for a given well configuration. With that database in hand, a well with a particular configuration (can be logged with an acoustic tool, such as the downhole logging tool 10, with the tubing 20 (see FIGS. 1 and 6) in place and the data obtained therefrom analyzed using the preselected frequency(s) of interest corresponding to that well configuration. Such a database can look like the following table:

TABLE 1

| Well Configuration | Frequency(s) of Interest |
|---|---|
| $C_1$ | $f_1, f_2$ |
| $C_2$ | $f_2, f_3, f_4$ |
| . | |
| . | |
| . | |
| $C_n$ | $f_n, f_m$ | where C1 . . . Cn are well configurations (e.g., tubing ID and OD, casing ID and OD, etc.) and $f_1, f_2 \ldots f_m$, etc. are the frequencies of interest. The database can be used by the surface electronics 15 and/or the downhole tool 10 to analyze received acoustic signals in an automated fashion various well configurations C1 . . . Cn without the need to trip out the tubing 20 (see FIGS. 1 and 6). For example, the spectral analysis code described above can be used with the database.

Figure 18:
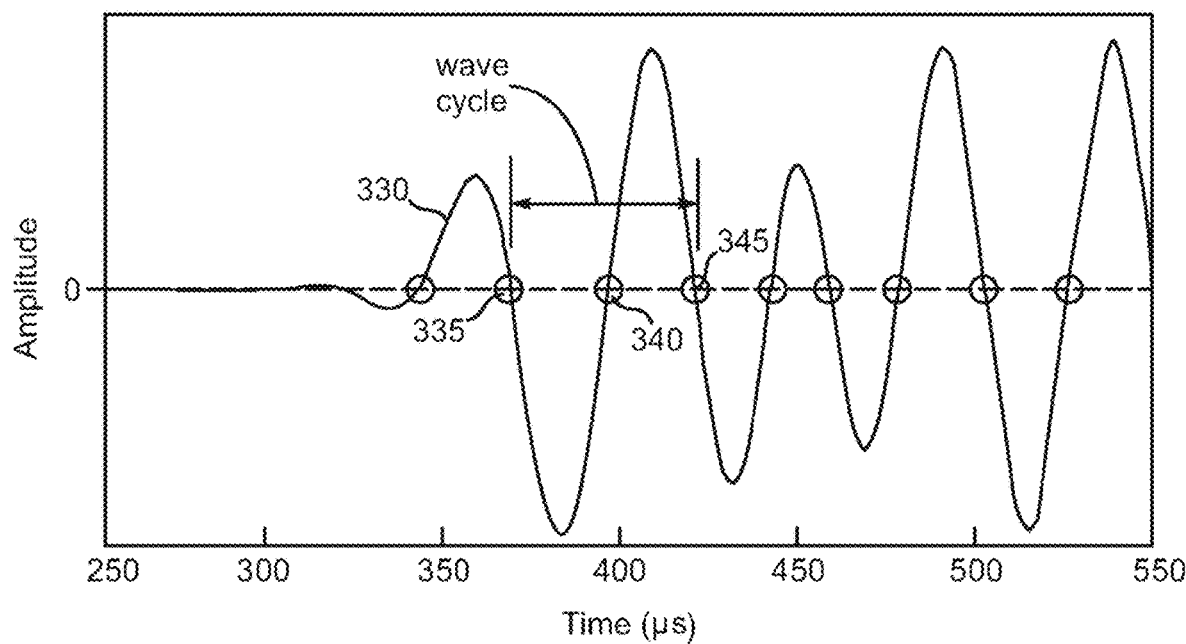
FIG. 18 is a waveform depicting wave cycles defined by zero crossings.

The foregoing described techniques use frequency domain analysis. However, time domain analysis can also be used to identify cement bond quality through tubing. Here, the techniques focus on direct processing of waveforms. Referring again to FIG. 6, a casing 25 at a location B of bad cement bond vibrates more freely than it does a location of a good cement bond (location A) in FIG. 5. These bad bond vibrations have their own frequency band, and generates additional waves with different frequencies propagating along the casing at their specific speeds. This extra vibration causes the wave's frequency contents to differ from those when the cement bond is of good quality. The change of frequency contents due to cement bond quality affects the lengths of the acoustic wave cycles. FIG. 18 shows an example of a wave 330 in time domain recorded by the downhole tool 10 shown in FIGS. 1 and 6. One of the many ways to determine the length of wave cycles is to measure zero-crossings 335, 340, 345, etc., where the wave 330 crosses zero amplitude. In each wave cycle, the waveform 330 will cross zero amplitude twice: one from positive to negative and one from negative to positive.

Figure 19:
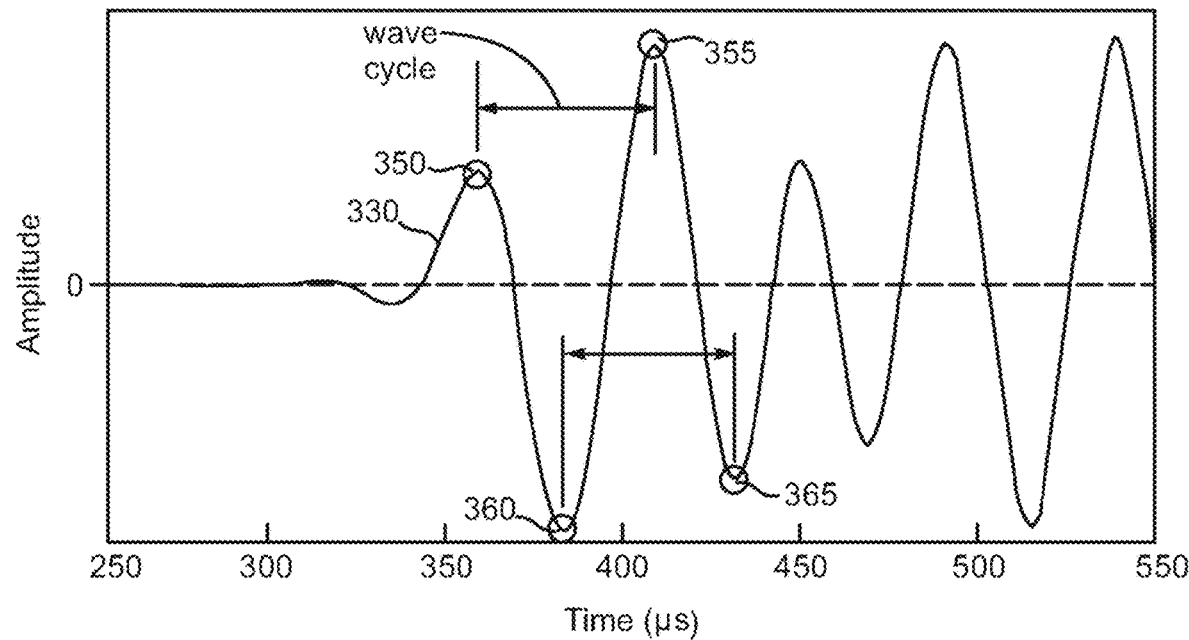
FIG. 19 is a waveform depicting wave cycles defined by peak to peak time.
Figure 20:
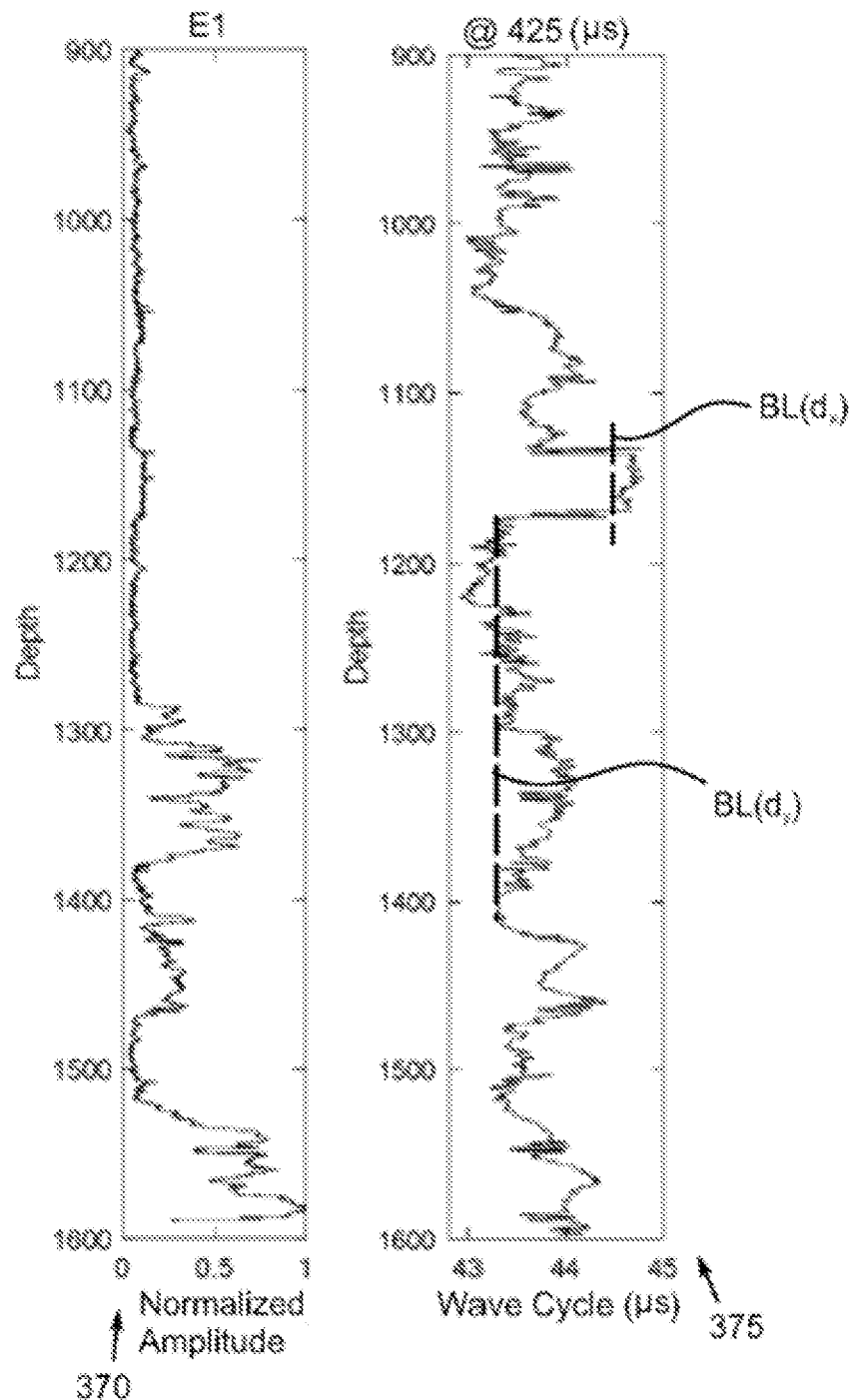
FIG. 20 depicts amplitudes versus depth for no tubing and for wave cycle length versus depth at a time window of interest.

Therefore, the length of a wave cycle is calculated from the time lapse between every other zero-crossing instance, i.e., between zero crossings 335 and 345. Another method of wave cycle measurement is using wave peaks and troughs as shown in FIG. 19. There, the waveform 330 has peaks 350 and 355 and troughs 360 and 365. The time between two adjacent peaks 350 and 355 or two adjacent troughs 360 and 365 is one wave cycle. The waves caused by a poorly bonded casing 25 at location B in FIG. 6 arrive at the receiver 80 at certain time windows, thus, it necessary to first determine where these time windows are in the time domain. These time windows can be estimated from experiments, numerically modeled or calculated analytically, or by combinations of these methods. For example, the same type of techniques used to generate the waveforms in FIG. 15 can be used and from those waveforms, suitable time windows can be selected. Within these specific time windows, the wave cycles can be either prolonged or shortened depending on the frequency contents and its strength of the casing waves. For example, experiments have identified 425 μs as a suitable time window for a 9 inch sized casing 25 and a 5 inch tubing 20. FIG. 20 shows two logs 370 and 375 for a depth range of 900 to 1,600 ft. The log 370 is for a conventional CBL first peak (E1) amplitude and shows bad bonds at depth ranges 1300 ft to 1380 ft, 1400 ft to 1450 ft and again at 1520 ft to 1600 ft. The log 375 is of wave cycle length as a function of the same depth range but a time window of 425 μs. Note that the wave cycles vary from a baseline just at 43 μs to nearly 45 μs. Significantly, the wave cycles are lengthened in the depth ranges 1300 ft to 1380 ft, 1400 ft to 1450 ft and again at 1520 ft to 1600 ft of bad cement bond indicated in the conventional log 370. Compared with the cement bond log 370 without the tubing, this method shows a very good sensitivity and accuracy. Note also that casing weight baseline corrections using multiple baselines $BL(d_x)$, $BL(d_y)$ of the type depicted in FIG. 11 can be applied to logs like the log 375 as well.

Depending on the time window, the cement bond signal can either prolong or shorten the wave cycles. To deal with the wave cycle deviation in systematic manner, the dominating wave cycle can be used as a reference point to measure the deviation from it. The dominating wave cycle/period $P_d$ can be determined by $1/f_{peak}$, where the $f_{peak}$ is the peak frequency from a frequency spectrum transformed from the full wave. Using FIG. 10 as an example, the $f_{peak}$ would be about 21 kHz. Then a parameter |time–$P_d$| will be used to generate a log like the log 375, where time is the time lapse between every other zero crossing instance discussed above.

A technical goal of the foregoing time domain analysis techniques to identify one or more time windows of interest is to generate a table of time windows of interest for a given well configuration. With that database in hand, a well with a particular configuration (can be logged with an acoustic tool, such as the downhole logging tool 10, with the tubing 20 (see FIGS. 1 and 6) in place and the data obtained therefrom analyzed using the preselected time window(s) of interest corresponding to that well configuration. Such a database can look like the following table:

TABLE 2

| Well Configuration | Time Window(s) of Interest |
|---|---|
| $C_1$ | $t_1, t_2$ |
| $C_2$ | $t_3$ |
| . | |
| . | |
| . | |
| $C_n$ | $t_n, t_m$ | where C1 ... Cn are well configurations (e.g., tubing ID and OD, casing ID and OD, etc.) and $t_1, t_2 ... t_m$, etc. are the time windows of interest. The database can be used by the surface electronics 15 and/or the downhole tool 10 to analyze received acoustic signals in an automated fashion for various well configurations C1 ... Cn without the need to trip out the tubing 20 (see FIGS. 1 and 6). For example, the time domain analysis code described above can be used with the database.

Figure 21:
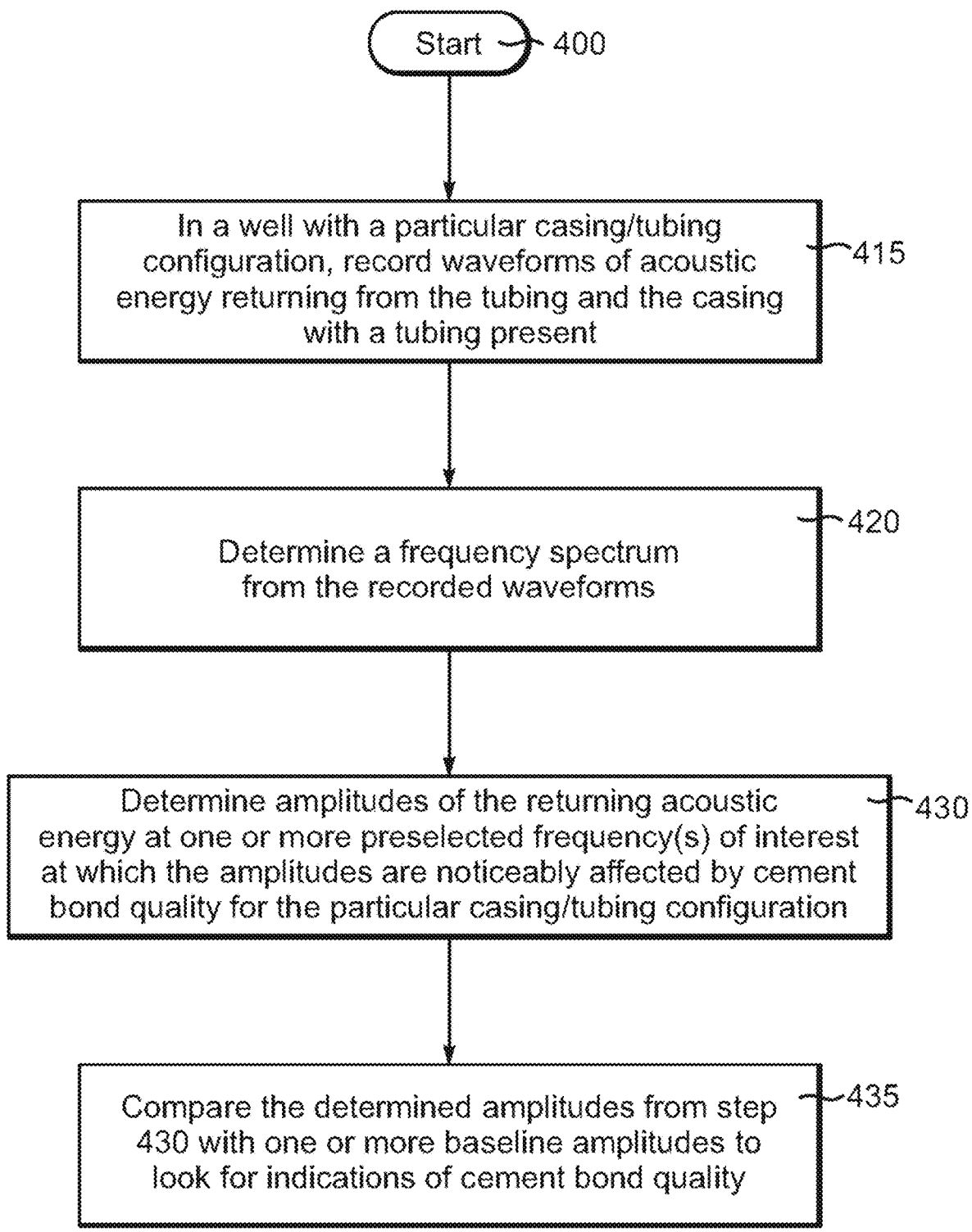
FIG. 21 is a flow chart depicting an exemplary logging method.

Some exemplary logging techniques will now be described in conjunction with FIGS. 1, 6 and 21-23. FIG. 21 is a block diagram that depicts an exemplary method of through tubing cement bond logging using full waveform spectral analysis. Following the start at step 400, at step 415, in a well with a particular casing/tubing configuration, waveforms of acoustic energy returning from a tubing and casing with the tubing present are recorded. For example, the downhole logging tool 10 is placed inside of a tubing 20 in a well with some particular tubing/casing configuration and acoustic energy is propagated and acoustic waveforms are recorded. For example, a graphical representation of some typical waveforms are shown in VDL format in FIGS. 8 and 9. At step 420, a frequency spectrum is determined from the recorded waveforms. An example frequency spectrum is depicted in FIG. 10 and discussed above. At step 430, the amplitudes of the returning acoustic energy at one or more preselected frequencies of interest at which the amplitudes are noticeably affected by cement bond quality for the particular casing/tubing configuration are determined. The one or more frequencies of interest are preselected using the techniques disclosed herein and described in conjunction with FIGS. 8-11 and 14-17. At step 435, the determine amplitudes are compared with one or more baseline amplitudes to look for indications of cement bond quality. For example, a log like the log 255 in FIG. 11 can be generated and the amplitudes compared to the one or more baselines, e.g. $BL(dr_n)$.

Figure 22:
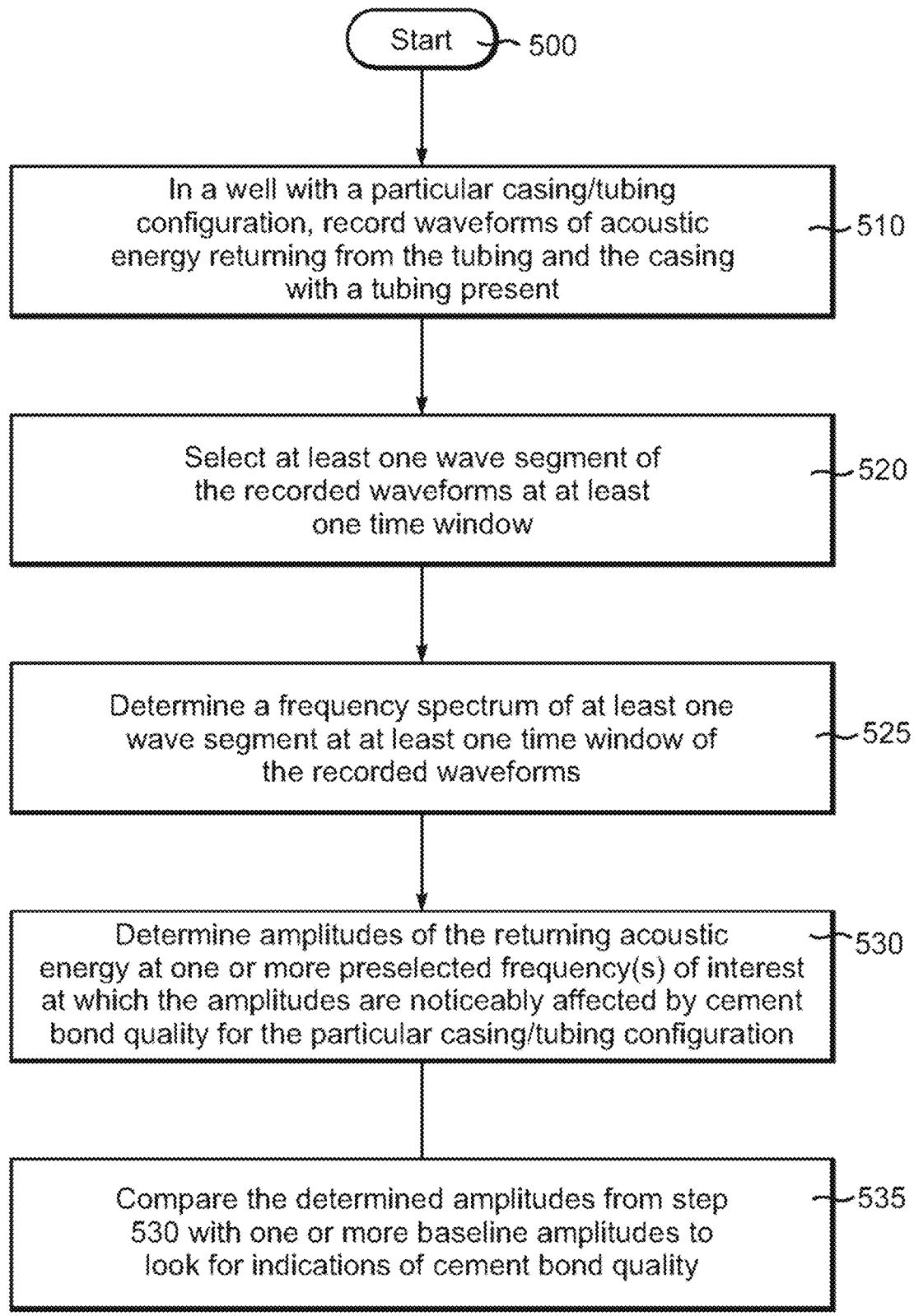
FIG. 22 is a flow chart depicting another exemplary logging method.

An alternate exemplary logging method utilizing spectral analysis over short time windows is depicted in the flow chart of FIG. 22. Here, after a start at step 500 waveforms of acoustic energy returning from a tubing and casing with the tubing present are recorded in a well with a particular casing/tubing configuration. For example, the downhole logging tool 10 is placed inside of a tubing in a well with some particular tubing/casing configuration and acoustic energy is propagated and acoustic waveforms are recorded. For example, a graphical representation of a waveform is shown in FIG. 12. At step 520, at least one wave segment of the recorded waveform at least one time window is selected. An example of this would be the wave segment 266 with a time window with a center 267 depicted in FIG. 12. At step 525, a frequency spectrum is determined for the selected wave segment from the recorded waveform. An example frequency spectrum 270 is depicted in FIG. 13 and discussed above. At step 530, the amplitudes of the returning acoustic energy at one or more preselected frequencies of interest at which the amplitudes are noticeably affected by cement bond quality for the particular casing/tubing configuration are determined. The one or more frequencies of interest are preselected using the techniques disclosed herein and described in conjunction with FIGS. 12-13 and 14-17. At step 535, the determine amplitudes are compared with one or more baseline amplitudes to look for indications of cement bond quality. For example, a log like the log 285 in FIG. 12 can be generated and the amplitudes compared to the one or more baselines.

Figure 23:
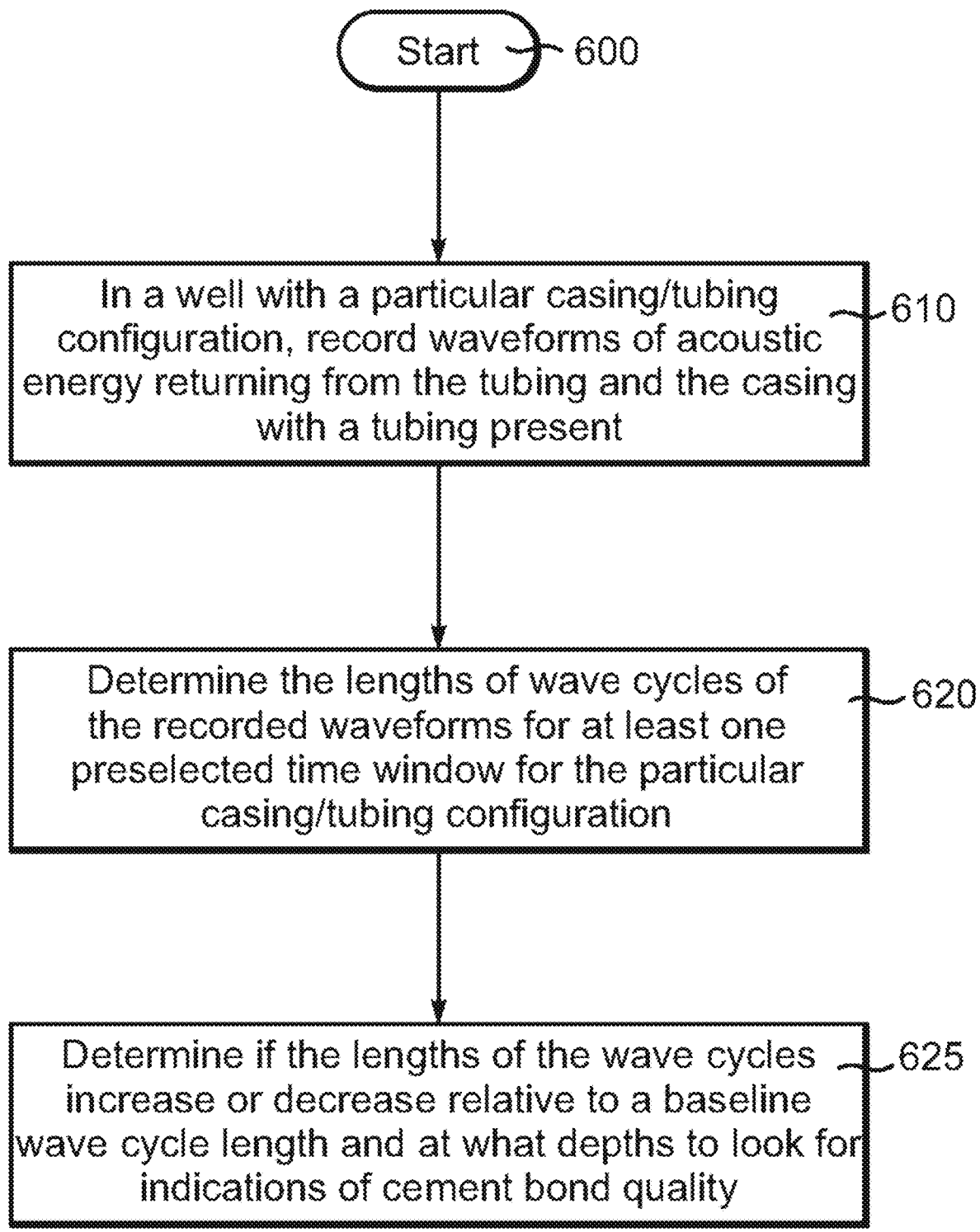
FIG. 23 is a flow chart depicting another exemplary logging method.

Still another exemplary logging method is shown in the flow chart of FIG. 23 where time domain analysis is used. Here, after a start at step 600 waveforms of acoustic energy returning from a tubing and casing with the tubing present are recorded in a well with a particular casing/tubing configuration. For example, the downhole logging tool 10 is placed inside of a tubing in a well with some particular tubing/casing configuration and acoustic energy is propagated and acoustic waveforms are recorded. For example, a graphical representation of waveforms are shown in FIGS. 18 and 19. At step 620, the lengths of wave cycles of the recorded waveforms for at least one preselected time window for the particular casing/tubing configuration are determined. For example, the techniques described above in conjunction with FIGS. 18 and 19 can be used to time window and definition of a wave cycle. At step 625 it is determined if the length of the wave cycles increase or decrease relative to a baseline wave cycle length and at what steps to look for indications of cement bond quality. For example, a log like the log 375 in FIG. 20 can be examined for changes relative to a baseline wave cycle length that are indicative of cement bond quality.

Figure 24:
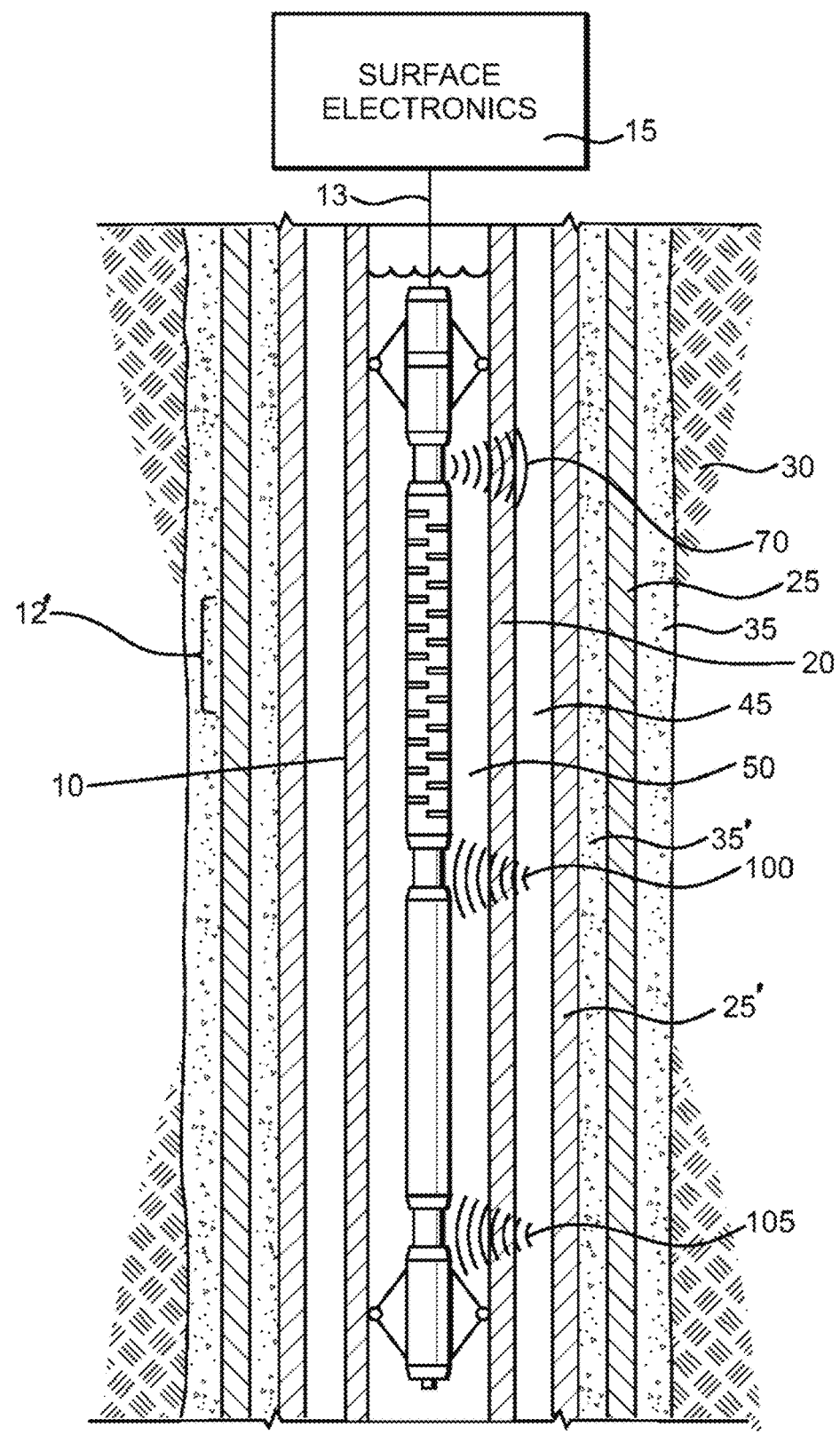
FIG. 24 is a schematic view of an exemplary embodiment of a downhole logging tool in an alternate exemplary well configuration.

As noted briefly above, the downhole logging tool 10 can be used for logging cement bonds in wells with more than one cemented annulus. FIG. 24 is a sectional view similar to FIG. 1, but depicts the downhole logging tool 10 suspended, and connected to the surface electronics 15, by the cable 13 inside the tubing 20 in an alternate well 12' that includes the well casing 25 as an outer casing that is separated laterally from the surrounding formation 30 by way of the cemented annulus 35, and an inner casing 25' separated from the outer casing 25 by another cemented annulus 35'. The annulus 45 between the tubing 20 and the inner casing 25' and the annular 50 of the tubing 20 are typically filled with one or more liquids, such as fresh water, salt water, hydrocarbons, drilling or other fluids. The downhole logging tool 10 can interrogate the quality of the bonds of both the cemented annulus 35 and the cemented annulus 35' using the transmitted acoustic vibrations 70 and received acoustic returns 100 and 105 and the techniques disclosed elsewhere. The techniques can be used with or without the tubing 20 present.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. A method for evaluating cement bond quality in a well, comprising:

in a well with a particular casing/tubing configuration, recording waveforms of acoustic energy returning from the tubing and the casing with the tubing present;

determining the lengths of wave cycles of the recorded waveforms for at least one preselected time window for the particular casing/tubing configuration; and determining if the lengths of the wave cycles are longer or shorter than a baseline wave cycle length and;

determining, based on whether the length of the wave cycles are longer or shorter than a baseline wave cycle length, at what depths to look for indications of cement bond quality.

2. The method of claim 1, wherein the wave cycles comprise the time between every other zero crossing of the recorded waveforms.

3. The method of claim 1, wherein the wave cycles comprise the time between adjacent amplitude peaks or adjacent amplitude troughs of the recorded waveforms.

4. A method for evaluating cement bond quality in a well with a particular casing/tubing configuration using waveforms of acoustic energy returning from the tubing and the casing with the tubing present, comprising:

determining the lengths of wave cycles of the recorded waveforms for at least one preselected time window for the particular casing/tubing configuration; and determining if the lengths of the wave cycles are longer or shorter than a baseline wave cycle length and;

determining, based on whether the length of the wave cycles are longer or shorter than a baseline wave cycle length, at what depths to look for indications of cement bond quality.

5. The method of claim 4, wherein the wave cycles comprise the time between every other zero crossing of the recorded waveforms.

6. The method of claim 4, wherein the wave cycles comprise the time between adjacent amplitude peaks or adjacent amplitude troughs of the recorded waveforms.

7. An apparatus for evaluating cement bond quality in a well with a particular casing/tubing configuration, the apparatus comprising:

a storage device for storing recorded waveforms of acoustic energy returning from the tubing and from the casing with the tubing present; and a processor programmed to:
  determine the lengths of wave cycles of the recorded waveforms for at least one preselected time window for the particular casing/tubing configuration;
  determine if the lengths of the wave cycles are longer or shorter than a baseline wave cycle length; and
  determine, based on whether the length of the wave cycles are longer or shorter than a baseline wave cycle length, at what depths to provide indications of cement bond quality.

8. The apparatus of claim 7, comprising a downhole logging tool, the storage device and processor contained in the downhole logging tool.

9. The apparatus of claim 7, comprising a downhole logging tool, the storage device and processor not contained in the downhole logging tool.

10. A computer readable medium having computer-executable instructions for performing a method of evaluating cement bond quality in a well with a particular casing/tubing configuration using waveforms of acoustic energy returning from the tubing and the casing with the tubing present comprising:

determining the lengths of wave cycles of the recorded waveforms for at least one preselected time window for the particular casing/tubing configuration; and determining if the lengths of the wave cycles are longer or shorter than a baseline wave cycle length and;

determining, based on whether the length of the wave cycles are longer or shorter than a baseline wave cycle length, at what depths to look for indications of cement bond quality.

\* \* \* \* \*